United States Patent
Wang et al.

(10) Patent No.: US 9,736,489 B2
(45) Date of Patent: Aug. 15, 2017

(54) MOTION VECTOR DETERMINATION FOR VIDEO CODING

(75) Inventors: Xianglin Wang, San Diego, CA (US); Yunfei Zheng, Cupertino, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 895 days.

(21) Appl. No.: 13/585,423

(22) Filed: Aug. 14, 2012

(65) Prior Publication Data

US 2013/0070854 A1 Mar. 21, 2013

Related U.S. Application Data

(60) Provisional application No. 61/535,964, filed on Sep. 17, 2011, provisional application No. 61/564,764, filed on Nov. 29, 2011, provisional application No. 61/564,799, filed on Nov. 29, 2011.

(51) Int. Cl.
*H04N 19/436* (2014.01)
*H04N 19/52* (2014.01)

(52) U.S. Cl.
CPC ........... *H04N 19/436* (2014.11); *H04N 19/52* (2014.11)

(58) Field of Classification Search
CPC ............................... H04N 19/30; H04N 19/96
See application file for complete search history.

(56) References Cited

U.S. PATENT DOCUMENTS

| 9,094,689 B2 | 7/2015 | Yu et al. |
| 2009/0097558 A1 | 4/2009 | Ye et al. |
| 2010/0158130 A1 | 6/2010 | Chen et al. |
| 2010/0220790 A1 | 9/2010 | Jeon et al. |
| 2011/0013697 A1 | 1/2011 | Choi et al. |
| 2011/0150085 A1 | 6/2011 | Andrijanic et al. |

(Continued)

FOREIGN PATENT DOCUMENTS

| CN | 101765016 A | 6/2010 |
| EP | 1765018 A1 | 3/2007 |

(Continued)

OTHER PUBLICATIONS

Bross, et al., "BoG Report on Non-CE MV Coding Proposals", MPEG Meeting; Nov. 28, 2011-Feb. 12, 2011; Geneva; (Motion Picture Expert Group or ISO/IEC JTC1/SC29/WG11), No. m22762, XP030051325, 25 pp.

(Continued)

*Primary Examiner* — Obafemi Sosanya

(57) ABSTRACT

For each prediction unit (PU) belonging to a coding unit (CU), a video coder generates a candidate list. The video coder generates the candidate list such that each candidate in the candidate list that is generated based on motion information of at least one other PU is generated without using motion information of any of the PUs belonging to the CU. After generating the candidate list for a PU, the video coder generates a predictive video block for the PU based on one or more reference blocks indicated by motion information of the PU. The motion information of the PU is determinable based on motion information indicated by a selected candidate in the candidate list for the PU.

52 Claims, 15 Drawing Sheets

(56) References Cited

U.S. PATENT DOCUMENTS

| | | |
|---|---|---|
| 2011/0170602 A1 | 7/2011 | Lee et al. |
| 2011/0280304 A1 | 11/2011 | Jeon et al. |
| 2011/0293001 A1 | 12/2011 | Lim et al. |
| 2012/0014452 A1 | 1/2012 | Maani et al. |
| 2012/0128060 A1* | 5/2012 | Lin et al. ............ 375/240.02 |
| 2012/0236941 A1* | 9/2012 | Lin .................. H04N 19/52 375/240.16 |
| 2012/0257678 A1* | 10/2012 | Zhou ............... H04N 19/436 375/240.16 |
| 2012/0263231 A1* | 10/2012 | Zhou ................ H04N 19/52 375/240.12 |
| 2012/0287999 A1* | 11/2012 | Li et al. ............. 375/240.16 |
| 2013/0003829 A1* | 1/2013 | Misra et al. ........ 375/240.12 |
| 2013/0177083 A1 | 7/2013 | Chen et al. |
| 2013/0215968 A1* | 8/2013 | Jeong ............... H04N 19/52 375/240.16 |
| 2014/0301461 A1 | 10/2014 | Jeon et al. |

FOREIGN PATENT DOCUMENTS

| | | |
|---|---|---|
| JP | 2014523708 A | 9/2014 |
| JP | 2014529254 A | 10/2014 |
| RU | 2335803 C2 | 10/2008 |
| RU | 2395174 C1 | 7/2010 |
| WO | 2004086302 A1 | 10/2004 |
| WO | 2007114608 A1 | 10/2007 |
| WO | 2011047994 A1 | 4/2011 |
| WO | WO 2011110039 A1 | 9/2011 |
| WO | 2011127828 A1 | 10/2011 |
| WO | 2011146451 A1 | 11/2011 |
| WO | 2013006386 A1 | 1/2013 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Zhou, et al.,"Modified winner-update search algorithm for fast block matching", Pattern Recognition Letters, Elsevier, Amsterdam, NL, vol. 25, No. 7, May 1, 2004, pp. 807-816, XP004500947.

International Preliminary Report on Patentability—PCT/US2012/050918, The International Bureau of WIPO—Geneva, Switzerland, May 15, 2014, 7 pp.

International Search Report and Written Opinion—PCT/US2012/050918—ISA/EPO—Nov. 22, 2012, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jung, et al., "CE13: Summary report of Core Experiment 13 on motion data parsing robustness and throughput", 98. MPEG Meeting; Nov. 28, 2011-Dec. 2, 2011; Geneva; (Motion Picture Expert Group or ISO/IEC JTC1/SC29/WG11), No. m22591, XP030051154, 12 pp.

Kim, et al., "Non-CE9: Throughput improvement for merge/skip mode", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16 ); URL: http://wftp3.1tu.int/av-arch/jctvc-site/, No. JCTVC-H0240, 5 pp.

Lin, et al., "Improved Advanced Motion Vector Prediction," JCT-VC Meeting; MPEG Meeting; Jan. 20, 2011-Jan. 28, 2011; MEGU; (Joint Collaborative Team on Video Coding of ISO/IEC JTC1/SC29/WG11AND ITU-T SG. 16); <URL: http://wftp3.itu.int/av-arch/jc tvc-site/>, No. JCTVC-D125, XP030008165, ISSN: 0000-0015; 8 pp.

Park, et al.,"CE9 Subtests N and O: Improvement on AMVP", MPEG Meeting; Mar. 21, 2011-Mar. 25, 2011; Geneva; (Motion Picture Expert Group or ISO/IEC JTC1/SC29/WG11), No. m19878, XP030048445, 5 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Yu, et al.,"Parallel AMVP candidate list construction", JCT-VC Meeting MPEG Meeting; Apr. 27, 2012-May 5, 2012; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-I0036, XP030111799, 7 pp.

Zheng et al., "CE9: Unified Merge and AMVP candidates selection (UNI03)", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/ No. JCTVC-F297, XP030009320, 12 pp.

Zheng, et al., "Non-CE9: Simplified Merge candidate derivation", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.1tu.int/av-arch/jctvc-site/,, No. JCTVC-G681, XP03011 0665, 5 pp.

Second Written Opinion from International Application No. PCT/US2012/050918, dated Sep. 13, 2013, 7 pp.

Response to Written Opinion dated Nov. 22, 2012, from International Application No. PCT/US2012/050918, filed on Mar. 4, 2013, 46 pp.

Response to Second Written Opinion dated Sep. 13, 2013, from International Application No. PCT/US2012/050918, filed on Oct. 29, 2013, 38 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Kim et al., "CU-based Merge Candidate List Construction," Joint Collaborative Team on Video Coding, Document: JCTVC-G416, Nov. 21-30, 2011, 13 pp.

Jeon et al., "Non-CE9: Improvement on Parallelized Merge/Skip Mode", JCT-VC Meeting; MPEG Meeting; Nov. 19-30, 2011; Geneva; (Joint Colloborative Team on Video Coding of ISO/IEC JTC1/SC29/WG11 and ITU-T SG.16); URL: http://eftp3.itu.int/av-arch/jctvc-site/, No. JCTVC-G164, XP030110148, 7 pp.

Laroche, et al., "CE9: Description of experiments ROB01 and ROB02," Joint Collaborative Team on Video Coding (JCT-VC), Jul. 14-22, 2011, [JCTVC-F474], 24 pp.

Zheng, et al., "Merge Candidate Selection in 2NxN, Nx2N, and NxN Mode", MPEG Meeting; Jul. 14-22, 2011; Torino; (Motion Picture Expert Group or ISO / IEC JTCI/SC29/WG11), No. m20723, JCTVC-F302, XP030049286, 6 pp.

Zhou, et al., "Parallelized merge/skip mode for HEVC", JCT-VC Meeting, MPEG Meeting; Jul. 14-22, 2011; Torino; (Joint Collaborative Team on Video Coding of ISO/IEC JTC1/SC29/WG11 and

(56) References Cited

OTHER PUBLICATIONS

ITU-T SG.16 ); <URL: http://wftp3.itu.int/av-arch/jctvc-site/,, No. JCTVC-F069, XP030009092, 13 pp.

Liu, et al., Method and Syntax for partial CU Merge, Joint Collaborative Team on Video Coding (JCT-VC) of ITU-T SG16 WP3 and ISO/IEC JTC1/SC29/WG11 5th meeting; Geneva, CH Mar. 16-23, 2011, No. JCTVC-E085, Mar. 20, 2011, 5 pp.

Zhou, et al., "Parallelized merge/skip mode for HEVC," Joint Collaborative Team on Video Coding (JCT-VC) of ITU-T SG16 WP3 and ISO/IEC JTC1/SC29/WG11, JCT-VC, Jul. 14-22, 2011, No. JCTVC-F069, Jul. 22, 2011; 13 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11, Apr. 27-May 7, 2012; No. JCTVC-I1003_d5, 294 pp.

Zheng, et al., "Merge Candidate Selection in 2NxN, Nx2N, and NxN Mode," Joint Collaborative Team on Video Coding (JCT-VC) of ITU-T SG16 WP3 and ISO/IEC JTC1/SC29/WG11, Jul. 14-22, 2011, No. JCTVC-F302, Jul. 17, 2011; 6 pp.

* cited by examiner

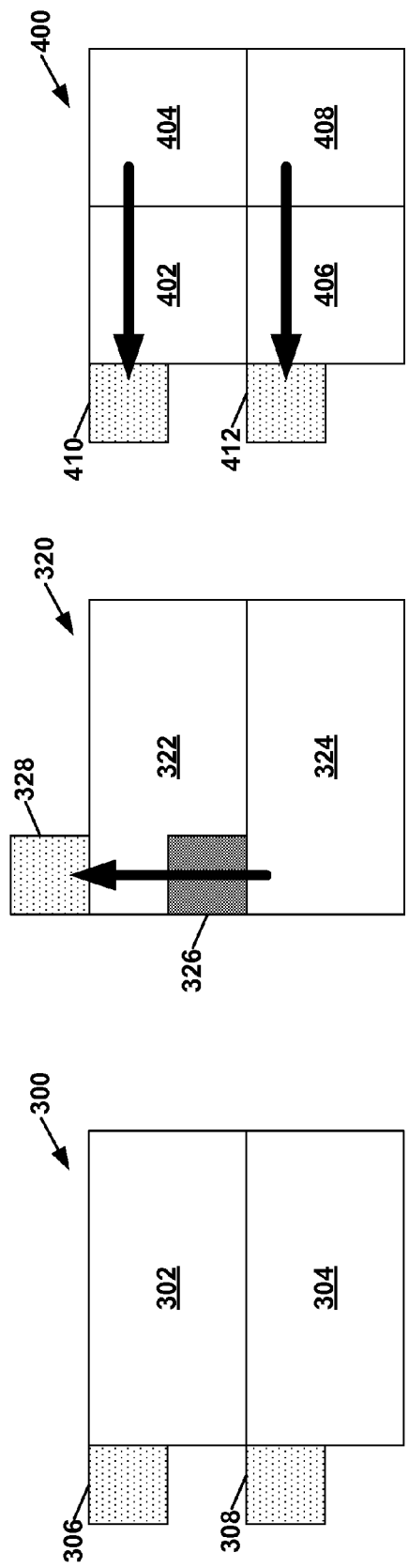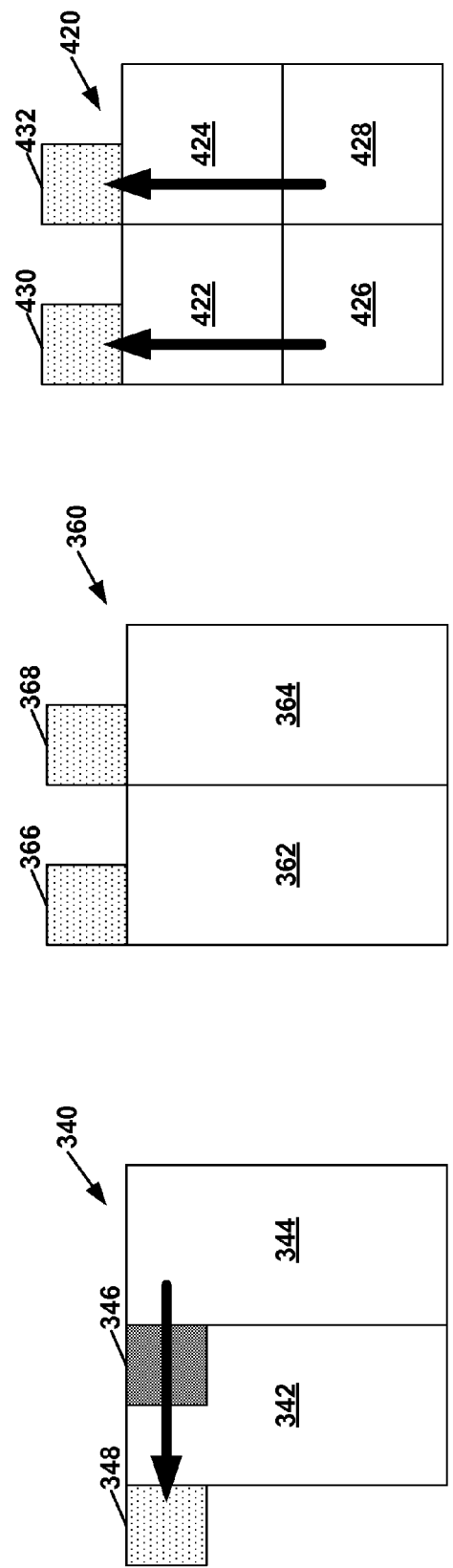

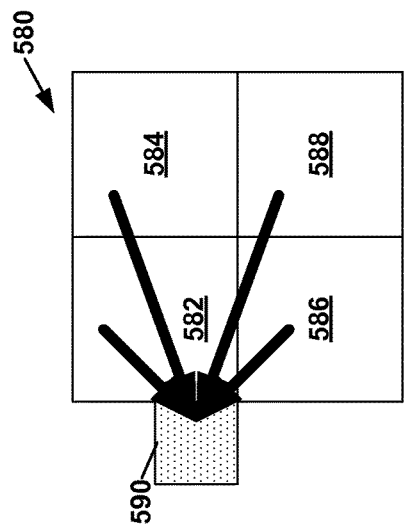
FIG. 10A
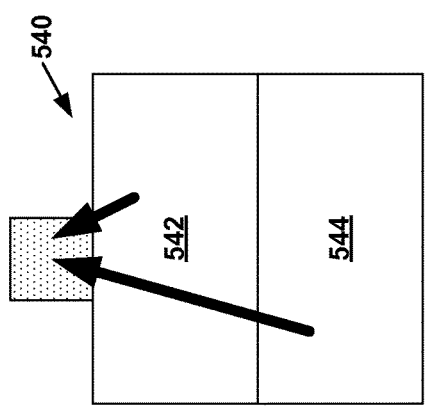
FIG. 10C
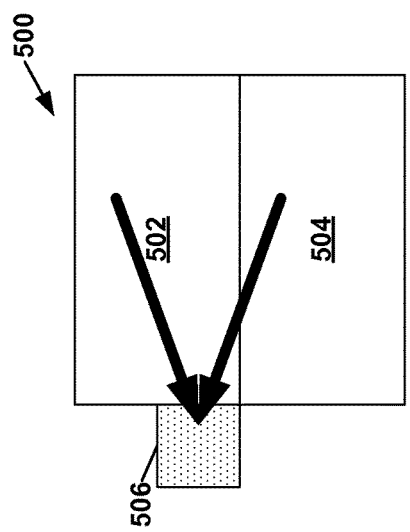
FIG. 10E
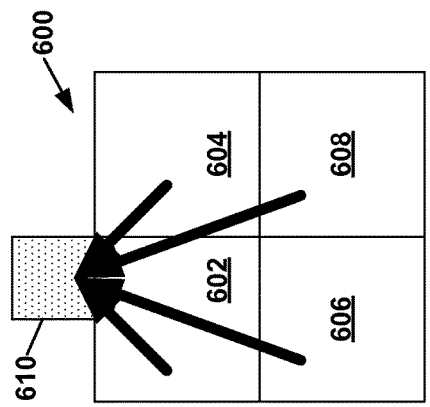
FIG. 10B
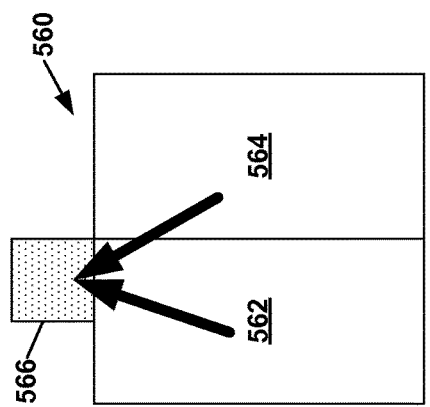
FIG. 10D
FIG. 10F ed using spatial prediction with respect to reference
MOTION VECTOR DETERMINATION FOR VIDEO CODING This application claims the benefit of U.S. Provisional Application No. 61/535,964, filed Sep. 17, 2011, U.S. Provisional Application No. 61/564,764, filed Nov. 29, 2011, and U.S. Provisional Application No. 61/564,799, filed Nov. 29, 2011, the entire content of each of which is incorporated herein by reference.

TECHNICAL FIELD

This disclosure relates to video coding and, more particularly, inter-frame prediction of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding video data. A video coder generates candidate lists for each prediction unit (PU) of a current coding unit (CU) according to merge mode or an advanced motion vector prediction (AMVP) process. The video coder generates the candidate lists such that each candidate in the candidate lists that is generated based on motion information of at least one other PU is generated without using motion information of any other PU belonging to the current CU. The candidates that are generated based on motion information of other PUs may include original candidates that indicate motion information of other PUs and candidates that indicate motion information derived from motion information of one or more other PUs. After generating the candidate list for a PU, the video coder may generate a predictive video block for the PU based on one or more reference blocks indicated by motion information of the PU. The motion information of the PU is determinable based on motion information indicated by one or more selected candidates in the candidate list for the PU. Because none of the candidates in the candidate lists for the PUs of the current CU are generated using motion information of any other PU of the current CU, the video coder may generate the candidate lists in parallel for one or more of the PUs of the current CU.

This disclosure describes a method for coding video data. The method comprises generating, for each PU in a plurality of PUs belonging to a current CU, a candidate list for the PU such that each candidate in the candidate list that is generated based on motion information of at least one other PU is generated without using motion information of any other PU belonging to the current CU. In addition, the method comprises generating, for each PU belonging to the current CU, a predictive video block for the PU based on a reference block indicated by motion information of the PU, the motion information of the PU being determinable based on motion information indicated by a selected candidate in the candidate list for the PU.

In addition, this disclosure describes a video coding device that comprises one or more processors configured to generate, for each PU in a plurality of PUs belonging to a current CU, a candidate list for the PU such that each candidate in the candidate list that is generated based on motion information of at least one other PU is generated without using motion information of any of the PUs belonging to the current CU. The one or more processors are further configured to generate, for each PU belonging to the current CU, a predictive video block for the PU based on a reference block indicated by motion information of the PU, the motion information of the PU being determinable based on motion information indicated by a selected candidate in the candidate list for the PU.

In addition, this disclosure describes a video coding device that comprises means for generating, for each PU in a plurality of PUs belonging to a current CU, a candidate list for the PU such that each candidate in the candidate list that is generated based on motion information of at least one other PU is generated without using motion information of any of the PUs belonging to the current CU. In addition, the video coding device comprises means for generating, for each PU belonging to the current CU, a predictive video block for the PU based on a reference block indicated by motion information of the PU, the motion information of the PU being determinable based on motion information indicated by a selected candidate in the candidate list for the PU.

In addition, this disclosure describes a computer program product that comprises one or more computer readable storage media that store instructions that, when executed, configure one or more processors to generate, for each PU in a plurality of PUs belonging to a current CU, a candidate list for the PU such that each candidate in the candidate list that is generated based on motion information of at least one other PU is generated without using motion information of any of the PUs belonging to the current CU. The instructions also configure the one or more processors to generate, for each PU belonging to the current CU, a predictive video block for the PU based on a reference block indicated by motion information of the PU, the motion information of the PU being determinable based on motion information indicated by a selected candidate in the candidate list for the PU.

The details of one or more examples are set forth in the accompanying drawings and the description below. Other features, objects, and advantages will be apparent from the description and drawings, and from the claims.

BRIEF DESCRIPTION OF DRAWINGS

FIG. 9A is a conceptual diagram that illustrates example reference index source locations to the left of a 2N×N partitioned CU.

FIG. 9B is a conceptual diagram that illustrates example reference index source locations to the left of an N×2N partitioned CU.

FIG. 9C is a conceptual diagram that illustrates example reference index source locations above a 2N×N partitioned CU.

FIG. 9D is a conceptual diagram that illustrates example reference index source locations above an N×2N partitioned CU.

FIG. 9E is a conceptual diagram that illustrates example reference index source locations to the left of an N×N partitioned CU.

FIG. 9F is a conceptual diagram that illustrates example reference index source locations above an N×N partitioned CU.

FIG. 10A is a conceptual diagram that illustrates an example reference index source location to the left of a 2N×N partitioned CU.

FIG. 10B is a conceptual diagram that illustrates an example reference index source location to the left of an N×2N partitioned CU.

FIG. 10C is a conceptual diagram that illustrates an example reference index source location above a 2N×N partitioned CU.

FIG. 10D is a conceptual diagram that illustrates an example reference index source location above an N×2N partitioned CU.

FIG. 10E is a conceptual diagram that illustrates an example reference index source location to the left of an N×N partitioned CU.

FIG. 10F is a conceptual diagram that illustrates an example reference index source location above an N×N partitioned CU.

DETAILED DESCRIPTION

Figure 1:
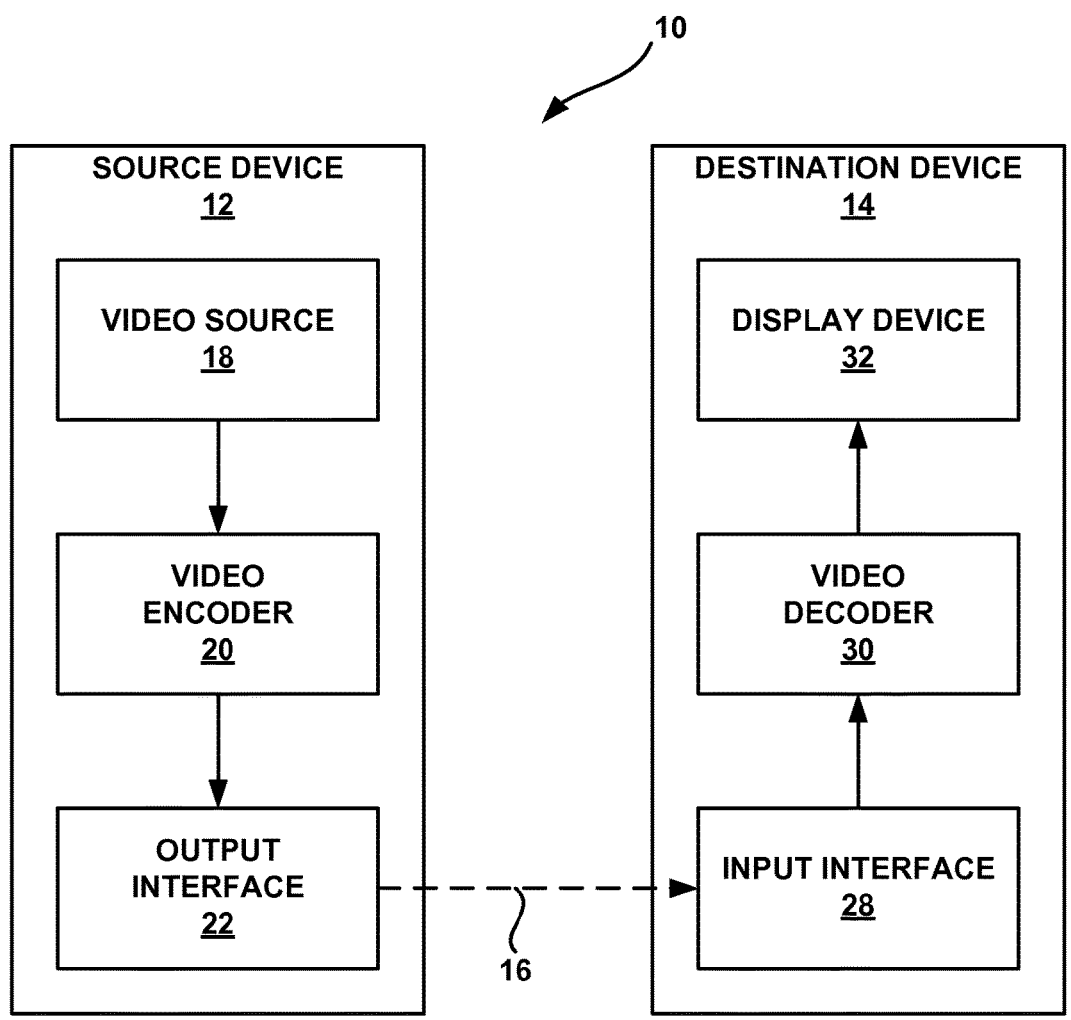
FIG. 1 is a block diagram illustrating an example video coding system that may utilize the techniques of this disclosure.

A video encoder may perform inter prediction to reduce temporal redundancy between pictures. As described below, a coding unit (CU) may have a plurality of prediction units (PUs). In other words, a plurality of PUs may belong to the CU. When the video encoder performs inter prediction, the video encoder may signal motion information for the PUs. The motion information of a PU may include a reference picture index, a motion vector, and a prediction direction indicator. The motion vector may indicate a displacement between a video block of the PU and a reference block of the PU. The reference block of the PU may be a portion of the reference picture that is similar to the video block of the PU. The reference block may be in a reference picture indicated by the reference picture index and the prediction direction indicator.

To reduce the number of bits required to represent the motion information of the PUs, the video encoder may generate candidate lists for each of the PUs according to a merge mode or an advanced motion vector prediction (AMVP) process. Each candidate in a candidate list for a PU may indicate motion information. The motion information indicated by some of the candidates in the candidate list may be based on the motion information of other PUs. For example, the candidate lists may include "original" candidates that indicate motion information of PUs that cover specified spatial or temporal candidate locations. Furthermore, in some examples, the candidate lists may include candidates generated by combining partial motion vectors from different original candidates. Furthermore, the candidate lists may include "artificial" candidates that are not generated based on motion information of other PUs, such as candidates that indicate motion vectors having zero magnitude.

In accordance with the techniques of this disclosure, the video encoder may generate candidate list for each PU of a CU such that each candidate in the candidate lists that is generated based on motion information of at least one other PU is generated without using motion information of any other PU belonging to the CU. Because none of the candidates in the candidate lists is generated using motion information of any other PU of the same CU, the video encoder may be able to generate the candidate lists in parallel. Generating the candidate lists in parallel may facilitate the implementation of the video encoder. In some instances, generating the candidate lists in parallel may be faster than generating the candidate lists in series.

After generating the candidate list for a PU of the CU, the video encoder may select a candidate from the candidate list and output a candidate index in a bitstream. The candidate index may indicate a position of the selected candidate in the candidate list. The video encoder may also generate a predictive video block for the PU based on a reference block indicated by the motion information of the PU. The motion information of the PU may be determinable based on the motion information indicated by the selected candidate. For instance, in merge mode, the motion information of the PU may be the same as the motion information indicated by the selected candidate. In AMVP mode, the motion information of the PU may be determined based on a motion vector difference of the PU and the motion information indicated by the selected candidate. The video encoder may generate one or more residual video blocks for the CU based on the predictive video blocks of the PUs of the CU and an original video block for the CU. The video encoder may then encode and output the one or more residual video blocks in the bitstream.

The video decoder may generate candidate lists for each of the PUs of the CU. In accordance with the techniques of this disclosure, the video decoder may, for each of the PUs, generate a candidate list for the PU such that each candidate in the candidate list that is generated based on motion information of at least one other PU is generated without using motion information of any other PU belonging to the CU. The candidate lists generated for the PUs by the video decoder may be the same as the candidate lists generated for the PUs by the video encoder. Because the video decoder may generate each of the candidates in the candidate lists without using motion information of any other PU of the CU, the video decoder may be able to generate the candidate lists in parallel.

The bitstream may include data that identify selected candidates in the candidate lists of the PUs. The video decoder may determine motion information of the PUs based on motion information indicated by the selected candidates in the candidate lists of the PUs. The video decoder may identify one or more reference blocks for the PUs based on the motion information of the PUs. After identifying the one or more reference blocks of a PU, the video decoder may generate a predictive video block for the PU based on the one or more reference blocks of the PU. The video decoder may reconstruct a video block for the CU based on the predictive video blocks for the PUs of the CU and one or more residual video blocks for the CU.

Accordingly, the techniques of this disclosure may enable a video coder (i.e., a video encoder or a video decoder) to generate, for each PU in a plurality of PUs belonging to a current CU, a candidate list for the PU such that each candidate in the candidate list that is generated based on motion information of at least one other PU is generated without using motion information of any other PU belonging to the current CU. The video coder may generate, for each PU belonging to the current CU, a predictive video block for the PU based on a reference block indicated by motion information of the PU, the motion information of the PU being determinable based on motion information indicated by a selected candidate in the candidate list for the PU.

For ease of explanation, this disclosure may describe locations or video blocks as having various spatial relationships with CUs or PUs. Such description may be interpreted to mean that the locations or video blocks have the various spatial relationships to the video blocks associated with the CUs or PUs. Furthermore, this disclosure may refer to a PU that a video coder is currently coding as the current PU. This disclosure may refer to a CU that a video coder is currently coding as the current CU. This disclosure may refer to a picture that a video coder is currently coding as the current picture.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A recent draft of the upcoming HEVC standard, referred to as "HEVC Working Draft 7" or "WD7," is described in document JCTVC-I1003_d54, Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, Switzerland, May, 2012, which, as of Jul. 19, 2012, is downloadable from: http://phenix.int-evry.fr/jct/doc_end_user/documents/9_Geneva/wg11/JCTVC-I1003-v6.zip, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats such as VP8 and related formats.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks (which in this case represent largest coding units) in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to the left of a given CU may have been encoded. CUs below or to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predictive video block for each PU of the CU. The predictive video block of a PU may be a block of samples. Video encoder 20 may use intra prediction or inter prediction to generate the predictive video block for a PU.

When video encoder 20 uses intra prediction to generate the predictive video block of a PU, video encoder 20 may generate the predictive video block of the PU based on decoded samples of the picture associated with the PU. If video encoder 20 uses intra prediction to generate predictive video blocks of the PUs of a CU, the CU is an intra-predicted CU. When video encoder 20 uses inter prediction to generate the predictive video block of the PU, video encoder 20 may generate the predictive video block of the PU based on decoded samples of one or more pictures other than the picture associated with the PU. If video encoder 20 uses inter prediction to generate predictive video blocks of the PUs of a CU, the CU is an inter-predicted CU.

Furthermore, when video encoder 20 uses inter prediction to generate a predictive video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predictive video block for the PU based on the reference blocks of the PU.

After video encoder 20 generates predictive video blocks for one or more PUs of a CU, video encoder 20 may generate residual data for the CU based on the predictive video blocks for the PUs of the CU. The residual data for the CU may indicate differences between samples in the predictive video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predictive video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predictive video blocks and reconstructing the residual video blocks, video decoder 30 may reconstruct the video block of the CU based on the predictive video blocks and the residual video blocks. In this way, video decoder 30 may reconstruct the video blocks of CUs based on the syntax elements in the bitstream.

As briefly described above, video encoder 20 may use inter prediction to generate predictive video blocks and motion information for the PUs of a CU. In many instances, the motion information of a given PU is likely to be the same or similar to the motion information of one or more nearby PUs (i.e., PUs whose video blocks are spatially or temporally nearby to the video block of the given PU). Because nearby PUs frequently have similar motion information, video encoder 20 may encode the motion information of a given PU with reference to the motion information of a nearby PU. Encoding the motion information of the given PU with reference to the motion information of the nearby PU may reduce the number of bits required in the bitstream to indicate the motion information of the given PU.

Video encoder 20 may encode the motion information of a given PU with reference to the motion information of a nearby PU in various ways. For example, video encoder 20 may indicate that the motion information of the given PU is the same as the motion information of the nearby PU. This disclosure may use the phrase "merge mode" to refer to indicating that the motion information of a given PU is the same as the motion information of a nearby PU or can be derived from motion information of nearby PUs. In another example, video encoder 20 may calculate a motion vector difference (MVD) for the given PU. The MVD indicates the difference between a motion vector of the given PU and a motion vector of the nearby PU. In this example, video encoder 20 may include the MVD in the motion information of the given PU instead of the motion vector of the given PU. Fewer bits may be required in the bitstream to represent the MVD than the motion vector of the given PU. This disclosure may use the phrase "advanced motion vector prediction" (AMVP) mode to refer to signaling the motion information of the given PU in this way.

To signal the motion information of a given PU using merge mode or AMVP mode, the video encoder 20 may generate a candidate list for the given PU. The candidate list may include one or more candidates. Each of the candidates in the candidate list for the given PU may specify motion information. The motion information indicated by a candidate may include a motion vector, a reference picture index, and a prediction direction indicator. The candidates in the candidate list may include candidates that are based on (e.g., indicate, are derived from, etc.) motion information of PUs other than the given PU, provided that the other PUs do not belong to the CU associated with the given PU.

After generating the candidate list for a PU, video encoder 20 may select one of the candidates from the candidate list for the PU. Video encoder 20 may output a candidate index for the PU. The candidate index may identify a position in the candidate list for the selected candidate.

Furthermore, video encoder 20 may generate a predictive video block for the PU based on reference blocks indicated by motion information of the PU. The motion information of the PU may be determinable based on motion information indicated by the selected candidate in the candidate list for the PU. For instance, in merge mode, the motion information of the PU may be the same as the motion information indicated by the selected candidate. In AMVP mode, the motion information of the PU may be determinable based on a motion vector difference for the PU and the motion information indicated by the selected candidate. Video encoder 20 may process the predictive video block for the PU as described above.

When video decoder 30 receives the bitstream, video decoder 30 may generate candidate lists for each of the PUs of the CU. The candidate lists generated for the PUs by video decoder 30 may be the same as the candidate lists generated for the PUs by video encoder 20. A syntax parsed from the bitstream may indicate the positions of selected candidates in the candidate lists of the PUs. After generating the candidate list for a PU, video decoder 30 may generate a predictive video block for the PU based on one or more reference blocks indicated by motion information of the PU. Video decoder 30 may determine the motion information of the PU based on motion information indicated by the selected candidate in the candidate list for the PU. Video decoder 30 may reconstruct a video block for the CU based on the predictive video blocks for the PUs and residual video blocks for the CU.

While encoding the motion information of a first PU with reference to the motion information of a second PU may reduce the number of bits required in the bitstream to indicate the motion information of the first PU, doing so may prevent video encoder 20 from encoding the motion information of the first PU until after video encoder 20 has encoded the motion information of the second PU. Consequently, video encoder 20 may be unable to encode the motion information of the first and second PUs in parallel. The ability to encode the motion information of multiple PUs in parallel may increase the throughput of video encoder 20.

Likewise, encoding the motion information of the first PU with reference to the motion information of the second PU may prevent video decoder 30 from determining the motion information of the first PU until after video decoder 30 has determined the motion information of the second PU. Consequently, video decoder 30 may be unable to generate predictive blocks for the first and second PUs in parallel. The ability to decode the motion information of multiple PUs in parallel may increase the throughput of video decoder 30.

In accordance with the techniques of this disclosure, video encoder 20 and video decoder 30 may generate candidate lists for each PU of the CU such that each candidate in the candidate list for the PU that is generated based on motion information of at least one other PU is generated without using motion information of any other PU of the same CU. Because no candidate is generated using the motion information of any other PU of the same CU, video encoder 20 may encode the motion information of multiple PUs of the CU in parallel. Because no candidate is generated using the motion information of any other PU of the same CU, video decoder 30 may decode the motion information of multiple PUs of the CU in parallel. This may increase the speed at which video encoder 20 may encode video data and video decoder 30 may decode video data.

In this way, a video coder (e.g., video encoder 20 or video decoder 30) may generate, for each PU in a plurality of PUs belonging to a current CU, a candidate list for the PU such that each candidate in the candidate list that is generated based on motion information of at least one other PU is generated without using motion information of any other PU belonging to the current CU. The video coder may generate, for each PU belonging to the current CU, a predictive video block for the PU based on a reference block indicated by motion information of the PU, the motion information of the PU being determinable based on motion information indicated by a selected candidate in the candidate list for the PU.

Figure 2:
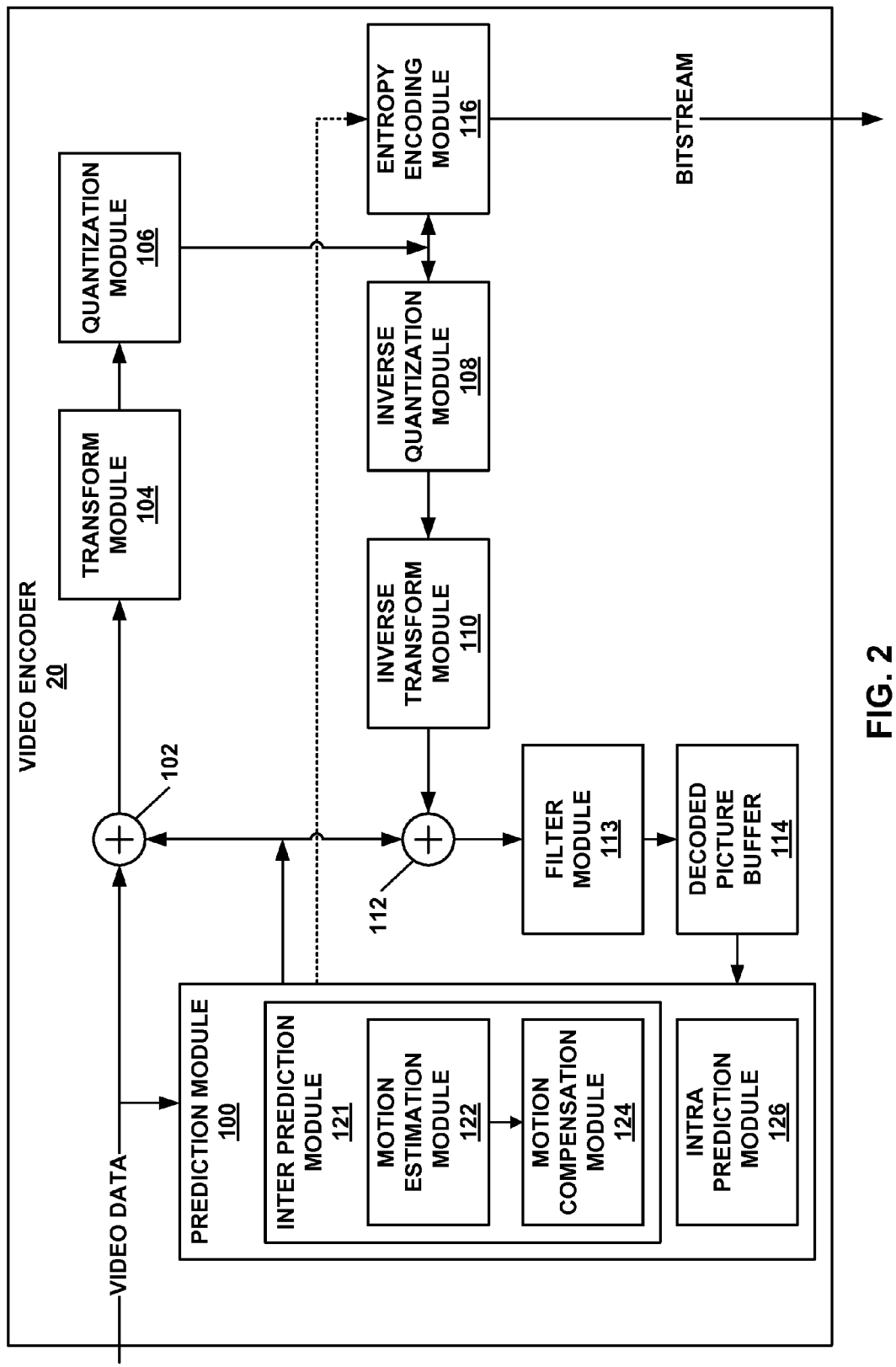
FIG. 2 is a block diagram illustrating an example video encoder that is configured to implement the techniques of this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predictive video block for the PU based the motion information and decoded samples of pictures other than the picture associated with the CU (i.e., reference pictures).

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predictive video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predictive video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predictive video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU or has motion information that can be derived from neighboring PUs. In another example, motion estimation module 122 may identify, in a syntax structure associated with the PU, a motion candidate associated with a neighboring PU and a motion vector difference (MVD). The motion vector difference indicates a difference between the motion vector of the PU and the motion vector of the indicated motion candidate. Video decoder 30 may use the motion vector of the indicated motion candidate and the motion vector difference to determine the motion vector of the PU. By referring to the motion information of a motion candidate associated with a first PU when signaling the motion information of a second PU, video encoder 20 may be able to signal the motion information of the second PU using fewer bits.

As described below with regard to FIGS. 4-6 and 8-15, inter prediction module 121 may generate a candidate list for each PU of a CU. Inter prediction module 121 may generate each candidate list such that each candidate in the candidate list that is generated based on motion information of at least one other PU is generated without using motion information of any of the PUs belonging to the CU. Consequently, inter prediction module 121 may be able to generate the candidate lists for two or more PUs of the CU in parallel. Because inter prediction module 121 may be able to generate the candidate lists for two or more PUs of the CU in parallel, inter prediction module 121 may be able to generate predictive video blocks for two or more of the PUs of the CU in parallel. Furthermore, by generating the candidate lists for each PU of the CU in this way, video encoder 20 may enable a video decoder (e.g., video decoder 30) to generate candidate lists for two or more PUs of the CU in parallel and generate predictive video blocks for two or more PUs of the CU in parallel.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predictive video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes. In some examples, the number of intra prediction modes may depend on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predictive video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predictive video blocks of the PUs of the CU and luminance components of samples in the original video block of the CU. In addition, the residual data of the CU may include residual video blocks that correspond to the differences between chrominance components of samples in the predictive video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predictive video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Figure 3:
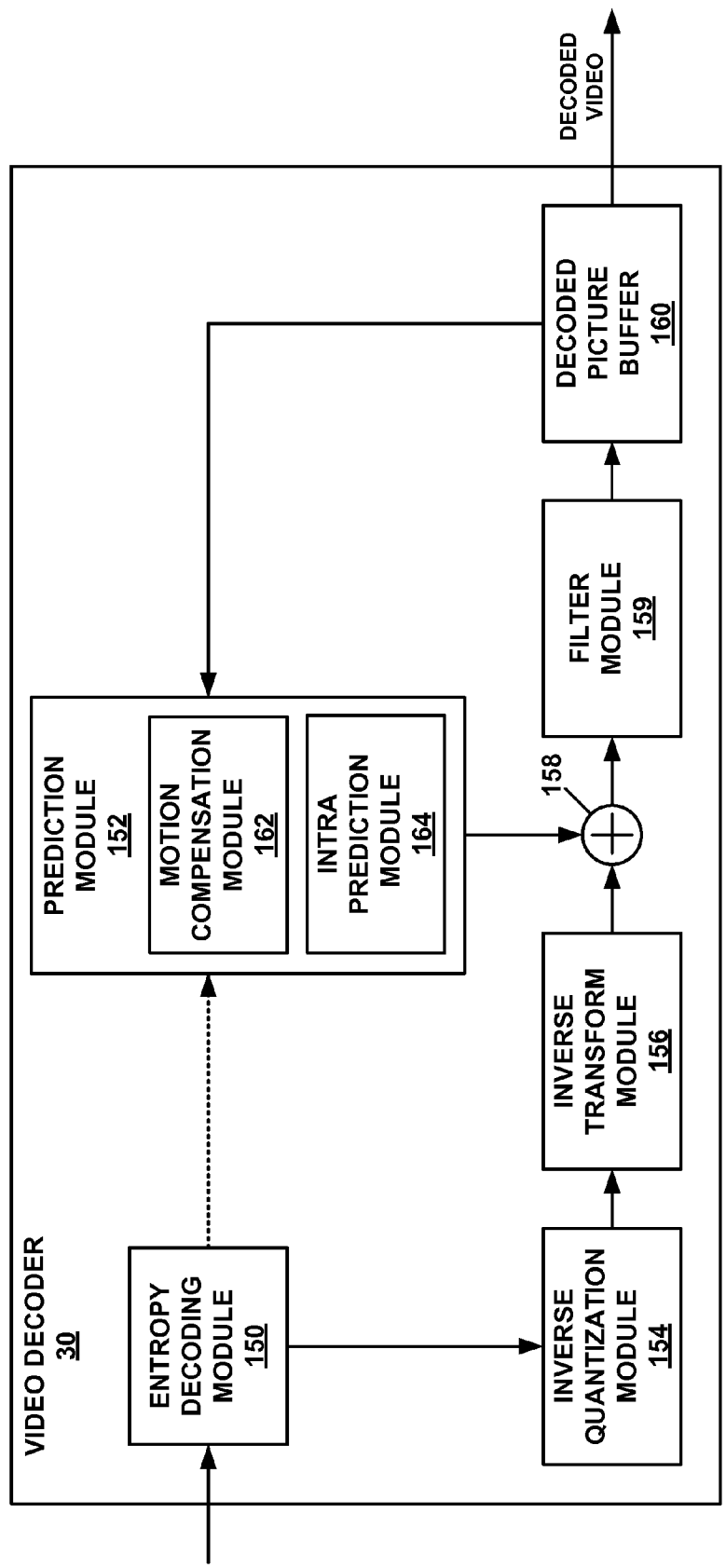
FIG. 3 is a block diagram illustrating an example video decoder that is configured to implement the techniques of this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If a PU of the CU was encoded using inter prediction, motion compensation module 162 may generate a candidate list for the PU. In accordance with the techniques of this disclosure, motion compensation module 162 may generate the candidate list for the PU such that each candidate in the candidate list that is generated based on motion information of at least one other PU is generated without using motion information of other PUs that belong to the same CU. The bitstream may include data that identify a position of a selected candidate in the candidate list of the PU. After generating the candidate list for the PU, motion compensation module 162 may generate a predictive video block for the PU based on one or more reference blocks indicated by the motion information of the PU. The reference blocks of the PU may be in different temporal pictures than the PU. Motion compensation module 162 may determine the motion information of the PU based on motion information indicated by the selected candidate in the candidate list of the PU.

In some examples, motion compensation module 162 may refine the predictive video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predictive video block of the PU to calculate interpolated values for sub-integer samples of a reference block. Motion compensation module 162 may determine the interpolation filters used by video encoder 20 according to received syntax information and use the interpolation filters to produce the predictive video block.

If a PU is encoded using intra prediction, intra prediction module 164 may perform intra prediction to generate a predictive video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predictive samples) for the PU based on the video blocks of spatially neighboring PUs.

Reconstruction module 158 may use the residual video blocks associated with TUs of a CU and the predictive video blocks of the PUs of the CU, i.e., either intra-prediction data or inter-prediction data, as applicable, to reconstruct the video block of the CU. Thus, video decoder 30 may generate a predictive video block and a residual video block based on syntax elements in the bitstream and may generate a video block based on the predictive video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
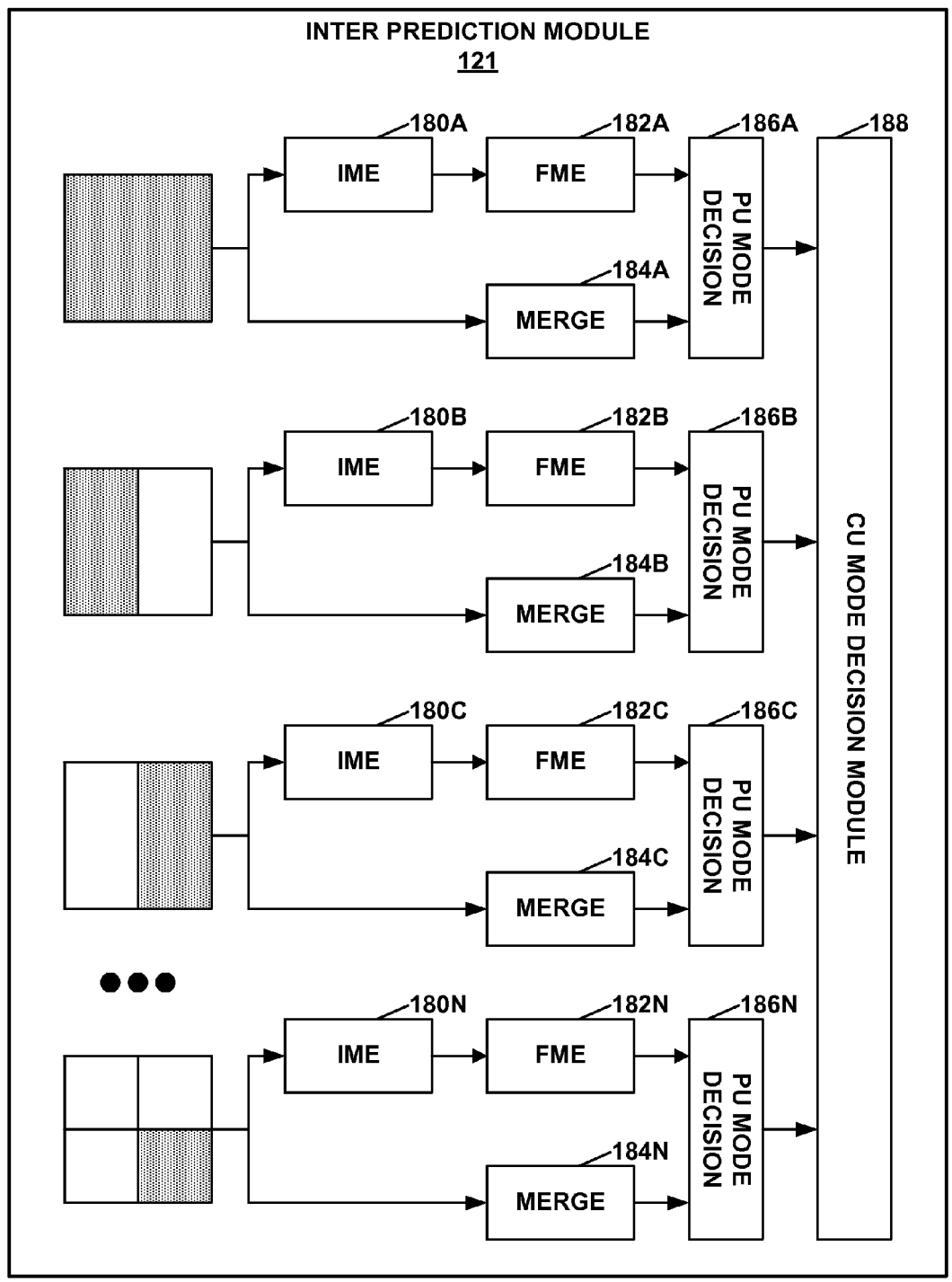
FIG. 4 is a block diagram that illustrates an example configuration of an inter prediction module.

FIG. 4 is a conceptual diagram that illustrates an example configuration of inter prediction module 121. Inter prediction module 121 may partition the current CU into PUs according to multiple partitioning modes. For example, inter prediction module 121 may partition the current CU into PUs according to 2N×2N, 2N×N, N×2N, and N×N partitioning modes.

Inter prediction module 121 may perform integer motion estimation (IME) and then perform fractional motion estimation (FME) on each of the PUs. When inter prediction module 121 performs IME on a PU, inter prediction module 121 may search one or more reference pictures for a reference block for the PU. After finding a reference block for the PU, inter prediction module 121 may generate a motion vector that indicates, in integer precision, a spatial displacement between the PU and the reference block for the PU. When inter prediction module 121 performs FME on the PU, inter prediction module 121 may refine the motion vector generated by performing IME on the PU. A motion vector generated by performing FME on a PU may have sub-integer precision (e.g., ½ pixel precision, ¼ pixel precision, etc.). After generating a motion vector for the PU, inter prediction module 121 may use the motion vector for the PU to generate a predictive video block for the PU.

Figure 6:
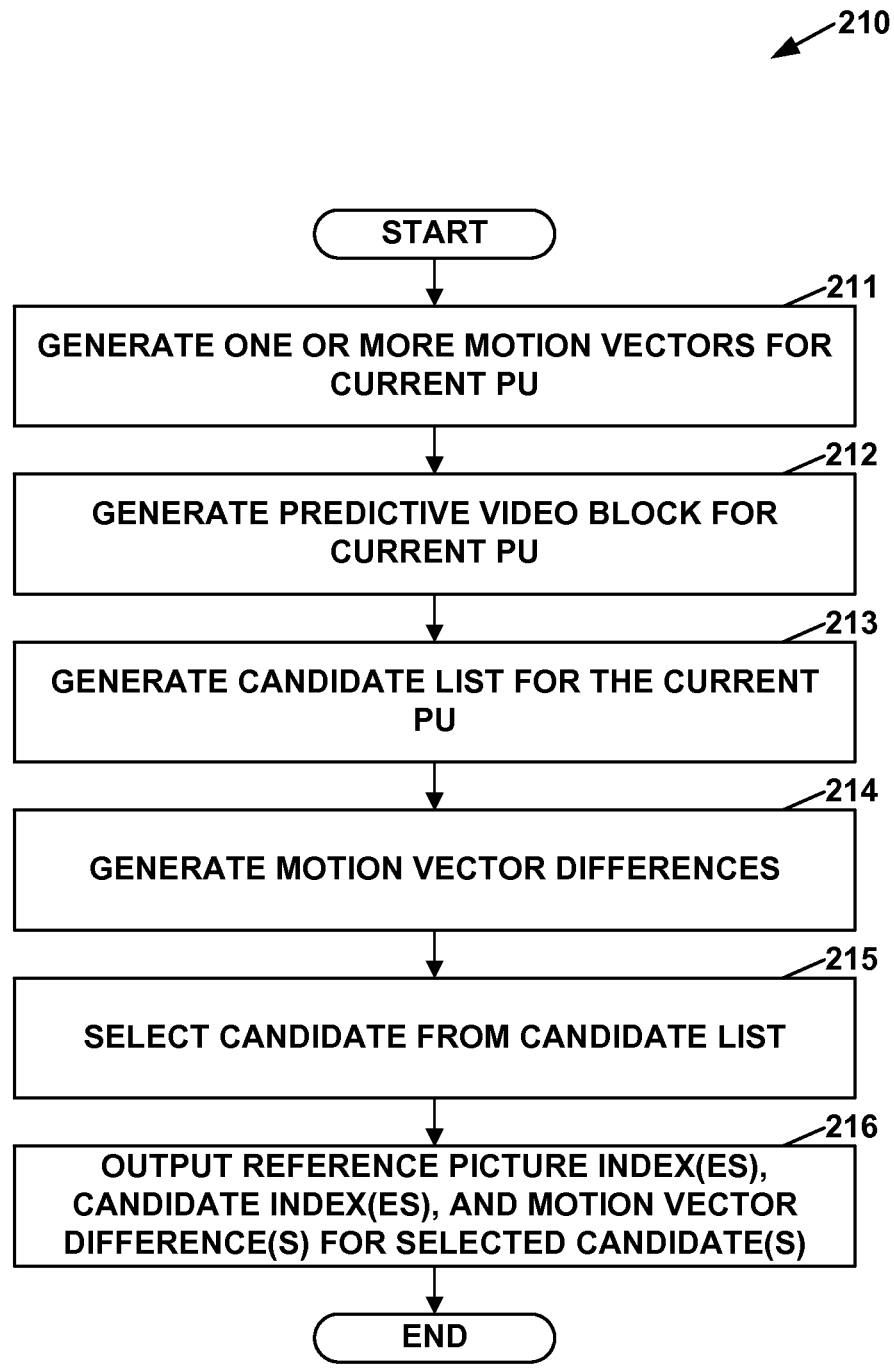
FIG. 6 is a flowchart that illustrates an example advanced motion vector prediction (AMVP) operation.

In some examples where inter prediction module 121 signals the motion information of the PU using AMVP mode, inter prediction module 121 may generate a candidate list for the PU. The candidate list may include one or more candidates that are generated based on motion information of other PUs. For instance, the candidate list may include original candidates that indicate motion information of other PUs and/or candidates that indicate motion information derived from motion information of one or more other PUs. After generating the candidate list for the PU, inter prediction module 121 may select a candidate from the candidate list and generate a motion vector difference (MVD) for the PU. The MVD for the PU may indicate a difference between a motion vector indicated by the selected candidate and the motion vector generated for the PU using IME and FME. In such examples, inter prediction module 121 may output a candidate index that identifies a location in the candidate list of the selected candidate. Inter prediction module 121 may also output the MVD of the PU. FIG. 6, described in detail below, illustrates an example AMVP operation.

In addition to generating motion information for the PUs by performing IME and FME on the PUs, inter prediction module 121 may perform merge operations on each of the PUs. When inter prediction module 121 performs a merge operation on a PU, inter prediction module 121 may generate a candidate list for the PU. The candidate list for the PU may include one or more original candidates. The original candidates in the candidate list may include one or more spatial candidates and a temporal candidate. The spatial candidates may indicate the motion information of other PUs in the current picture. The temporal candidate may be based on motion information of a collocated PU of a picture other than the current picture. The temporal candidate may also be referred to as the temporal motion vector predictor (TMVP).

Figure 5:
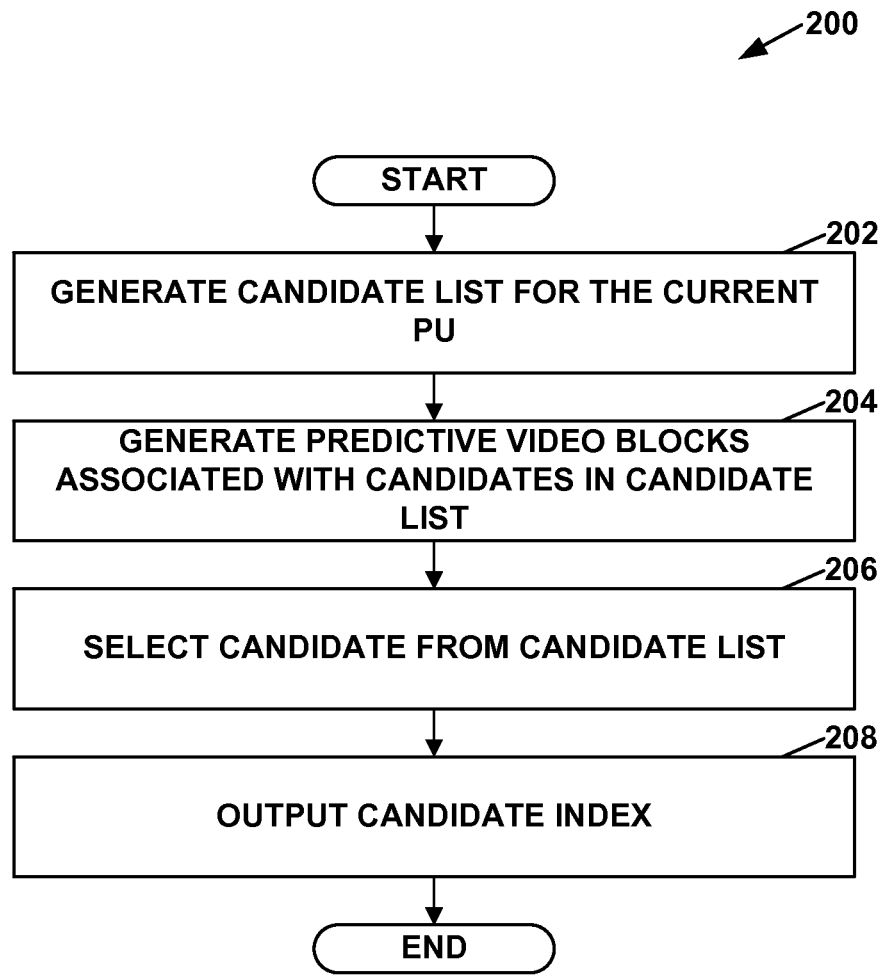
FIG. 5 is a flowchart that illustrates an example merge operation.

After generating the candidate list, inter prediction module 121 may select one of the candidates from the candidate list. Inter prediction module 121 may then generate a predictive video block for the PU based on reference blocks indicated by motion information of the PU. In merge mode, the motion information of the PU may be the same as the motion information indicated by the selected candidate. FIG. 5, described below, is a flowchart that illustrates an example merge operation.

After generating a predictive video block for the PU based on IME and FME and after generating a predictive video block for the PU based on a merge operation, inter prediction module 121 may select the predictive video block generated by the FME operation or the predictive video block generated by the merge operation. In some examples, inter prediction module 121 may select a predictive video block for the PU based on a rate/distortion analysis of the predictive video block generated by the FME operation and the predictive video block generated by the merge operation.

After inter prediction module 121 has selected predictive video blocks for the PUs generated by partitioning the current CU according to each of the partitioning modes, inter prediction module 121 may select a partitioning mode for the current CU. In some examples, inter prediction module 121 may select a partitioning mode for the current CU based on a rate/distortion analysis of the selected predictive video blocks for the PUs generated by partitioning the current CU according to each of the partitioning modes. Inter prediction module 121 may output the predictive video blocks associated with PUs belonging to the selected partitioning mode to residual generation module 102. Inter prediction module 121 may output syntax elements indicating the motion information of the PUs belonging to the selected partitioning mode to entropy encoding module 116.

In the example of FIG. 4, inter prediction module 121 includes IME modules 180A-180N (collectively, "IME modules 180"), FME modules 182A-182N (collectively, "FME modules 182"), merge modules 184A-184N (collectively, merge modules 184"), PU mode decision modules 186A-186N (collectively, "PU mode decision modules 186"), and a CU mode decision module 188.

IME modules 180, FME modules 182, and merge modules 184 may perform IME operations, FME operations, and merge operations on PUs of the current CU. The example of FIG. 4 illustrates inter prediction module 121 as including separate IME modules 180, FME modules 182, and merge modules 184 for each PU of each partitioning mode of the CU. In other examples, inter prediction module 121 does not include separate IME modules 180, FME modules 182, and merge modules 184 for each PU of each partitioning mode of the CU.

As illustrated in the example of FIG. 4, IME module 180A, FME module 182A, and merge module 184A may perform an IME operation, an FME operation, and a merge operation on a PU generated by partitioning the CU according to a 2N×2N partitioning mode. PU mode decision module 186A may select one of the predictive video blocks generated by IME module 180A, FME module 182A, and merge module 184A.

IME module 180B, FME module 182B, and merge module 184B may perform an IME operation, an FME operation, and a merge operation on a left PU generated by partitioning the CU according to an N×2N partitioning mode. PU mode decision module 186B may select one of the predictive video blocks generated by IME module 180B, FME module 182B, and merge module 184B.

IME module 180C, FME module 182C, and merge module 184C may perform an IME operation, an FME operation, and a merge operation on a right PU generated by partitioning the CU according to an N×2N partitioning mode. PU mode decision module 186C may select one of the predictive video blocks generated by IME module 180C, FME module 182C, and merge module 184C.

IME module 180N, FME module 182N, and merge module 184 may perform an IME operation, an FME operation, and a merge operation on a bottom right PU generated by partitioning the CU according to an N×N partitioning mode. PU mode decision module 186N may select one of the predictive video blocks generated by IME module 180N, FME module 182N, and merge module 184N.

After PU mode decision modules 186 select predictive video blocks for the PUs of the current CU, CU mode decision module 188 selects a partitioning mode for the current CU and outputs predictive video blocks and motion information of the PUs belonging to the selected partitioning mode.

FIG. 5 is a flowchart that illustrates an example merge operation 200. A video encoder, such as video encoder 20, may perform merge operation 200. In other examples, the video encoder may perform merge operations other than merge operation 200. For instance, in other examples, the video encoder may perform a merge operation in which the video encoder performs more, fewer, or different steps than merge operation 200. In other examples, the video encoder may perform the steps of merge operation 200 in different orders or in parallel. The encoder may also perform merge operation 200 on PU encoded in skip mode.

After the video encoder starts merge operation 200, the video encoder may generate a candidate list for the current PU (202). The video encoder may generate the candidate list for the current PU in various ways. For instance, the video encoder may generate the candidate list for the current PU according to one of the example techniques described below with regard to FIGS. 8-15.

As briefly discussed above, the candidate list for the current PU may include a temporal candidate. The temporal candidate may indicate the motion information of a collocated PU. The collocated PU may be spatially collocated with the current PU, but is in a reference picture instead of the current picture. This disclosure may refer to the reference picture that includes the collocated PU as the relevant reference picture. This disclosure may refer to a reference picture index of the relevant reference picture as the relevant reference picture index. As described above, the current picture may be associated with one or more lists of reference pictures, e.g. list 0, list 1, etc. A reference picture index may indicate a reference picture by indicating a position of the reference picture in one of the lists of reference pictures. In some examples, the current picture may be associated with a combined reference picture list.

In some conventional video encoders, the relevant reference picture index is the reference picture index of a PU that covers a reference index source location associated with the current PU. In such conventional video encoders, the reference index source location associated with the current PU is immediately to the left of the current PU or immediately above the current PU. In this disclosure, a PU may "cover" a particular location if the video block associated with the PU includes the particular location. In such conventional video encoders, the video encoder may use a reference picture index of zero if the reference index source location is not available.

However, there may be instances where the reference index source location associated with the current PU is within the current CU. In such instances, the PU covering the reference index source location associated with the current PU may be considered available if this PU is above or to the left of the current CU. However, the video encoder may need to access the motion information of another PU of the current CU in order to determine the reference picture containing the collocated PU. Hence, such conventional video encoders may use the motion information (i.e., the reference picture index) of a PU that belongs to the current CU to generate the temporal candidate for the current PU. In other words, such conventional video encoders may generate the temporal candidate using motion information of a PU that belongs to the current CU. Consequently, the video encoder may be unable to generate candidate lists for the current PU and the PU that covers the reference index source location associated with the current PU in parallel.

In accordance with the techniques of this disclosure, the video encoder may explicitly set, without reference to the reference picture index of any other PU, the relevant reference picture index. This may enable the video encoder to generate candidate lists for the current PU and other PUs of the current CU in parallel. Because the video encoder explicitly sets the relevant reference picture index, the relevant reference picture index is not based on the motion information of any other PU of the current CU. In some examples where the video encoder explicitly sets the relevant reference picture index, the video encoder may always set the relevant reference picture index to a fixed predefined default reference picture index, such as 0. In this way, the video encoder may generate a temporal candidate based on motion information of a collocated PU in a reference frame indicated by a default reference picture index and may include the temporal candidate in the candidate list of the current CU.

In examples where the video encoder explicitly sets the relevant reference picture index, the video encoder may explicitly signal the relevant reference picture index in a syntax structure, such as a picture header, a slice header, an APS, or another syntax structure. In this example, the video encoder may signal the relevant reference picture index for every LCU, CU, PU, TU or other type of sub-block. For instance, the video encoder may signal that the relevant reference picture indexes for each PU of a CU are equal to "1."

In some examples, such as those described below with reference to FIGS. 9A-9F and 10A-F, the relevant reference picture index may be set implicitly instead of explicitly. In such examples, the video encoder may generate each temporal candidate in the candidate lists for PUs of the current CU using motion information of PUs in reference pictures indicated by reference picture indexes of PUs that cover locations outside the current CU, even if such locations are not strictly adjacent to the current PUs (i.e., the PUs of the current CU).

After generating the candidate list for the current PU, the video encoder may generate predictive video block associated with the candidates in the candidate list (204). The video encoder may generate a predictive video block associated with a candidate by determining motion information of the current PU based on the motion information of the indicated candidate and then generating the predictive video block based on one or more reference blocks indicated by the motion information of the current PU. The video encoder may then select one of the candidates from the candidate list (206). The video encoder may select the candidate in various ways. For example, the video encoder may select one of the candidates based on a rate/distortion analysis on each of the predictive video blocks associated with the candidates.

After selecting the candidate, the video encoder may output a candidate index (208). The candidate index may indicate a position of the selected candidate in the candidate list. In some examples, the candidate index may be denoted as "merge_idx."

FIG. 6 is a flowchart that illustrates an example AMVP operation 210. A video encoder, such as video encoder 20, may perform AMVP operation 210. FIG. 6 is merely one example of an AMVP operation.

After the video encoder starts AMVP operation 210, the video encoder may generate one or more motion vectors for a current PU (211). The video encoder may perform integer motion estimation and fractional motion estimation to generate the motion vectors for the current PU. As described above, the current picture may be associated with two reference picture lists, list 0 and list 1. If the current PU is uni-directionally predicted, the video encoder may generate a list 0 motion vector or a list 1 motion vector for the current PU. The list 0 motion vector may indicate a spatial displacement between the video block of the current PU and a reference block in a reference picture in list 0. The list 1 motion vector may indicate a spatial displacement between the video block of the current PU and a reference block in a reference picture in list 1. If the current PU is bi-directionally predicted, the video encoder may generate a list 0 motion vector and a list 1 motion vector for the current PU.

After generating the motion vector or motion vectors for the current PU, the video encoder may generate a predictive video block for the current PU (212). The video encoder may generate the predictive video block for the current PU based on one or more reference blocks indicated by the one or more motion vectors for the current PU.

In addition, the video encoder may generate a candidate list for the current PU (213). Each candidate in the candidate list that is generated based on motion information of at least one other PU is generated without using motion information of any other PU belonging to the current CU. The video coder may generate the candidate list for the current PU in various ways. For instance, the video encoder may generate the candidate list for the current PU according to one or more of the example techniques described below with regard to FIGS. 8-15. In some examples, when the video encoder generates the candidate list in AMVP operation 210, the candidate list may be limited to two candidates. In contrast, when the video encoder generates the candidate list in a merge operation, the candidate list may include more candidates (e.g., five candidates).

After generating the candidate list for the current PU, the video encoder may generate one or more motion vector differences (MVDs) for each candidate in the candidate list (214). The video encoder may generate a motion vector difference for a candidate by determining a difference between a motion vector indicated by the candidate and a corresponding motion vector of the current PU.

If the current PU is uni-directionally predicted, the video encoder may generate a single MVD for each candidate. If the current PU is bi-directionally predicted, the video encoder may generate two MVDs for each candidate. The first MVD may indicate a difference between a motion vector of the candidate and the list 0 motion vector of the current PU. The second MVD may indicate a difference between a motion vector of the candidate and the list 1 motion vector of the current PU.

The video encoder may select one or more of the candidates from the candidate list (215). The video encoder may select the one or more candidates in various ways. For example, the video encoder may select one of the candidates based on the number of bits required to represent the motion vector differences for the candidates.

After selecting the one or more candidates, the video encoder may output one or more reference picture indexes for the current PU, one or more candidate indexes, and the one or more motion vector differences for the one or more selected candidates (216).

In instances where the current picture is associated with two reference picture lists, list 0 and list 1, and the current PU is uni-directionally predicted, the video encoder may output a reference picture index for list 0 ("ref_idx_l0") or list 1 ("ref_idx_l1"). The video encoder may also output a candidate index ("mvp_l0_flag") that indicates a position in the candidate list of the selected candidate for the list 0 motion vector of the current PU. Alternatively, the video encoder may output a candidate index ("mvp_l1_flag") that indicates a position in the candidate list of the selected candidate for the list 1 motion vector of the current PU. The video encoder may also output the MVD for the list 0 motion vector or list 1 motion vector of the current PU.

In instances where the current picture is associated with two reference picture lists, list 0 and list 1, and the current PU is bi-directionally predicted, the video encoder may output a reference picture index for list 0 ("ref_idx_l0") and a reference picture index for list 1 ("ref_idx_l1"). The video encoder may also output a candidate index ("mvp_l0_flag") that indicates a position in the candidate list of the selected candidate for the list 0 motion vector of the current PU. In addition, the video encoder may output a candidate index ("mvp_l1_flag") that indicates a position in the candidate list of the selected candidate for the list 1 motion vector of the current PU. The video encoder may also output the MVD for the list 0 motion vector of the current PU and the MVD for the list 1 motion vector of the current PU.

Figure 7:
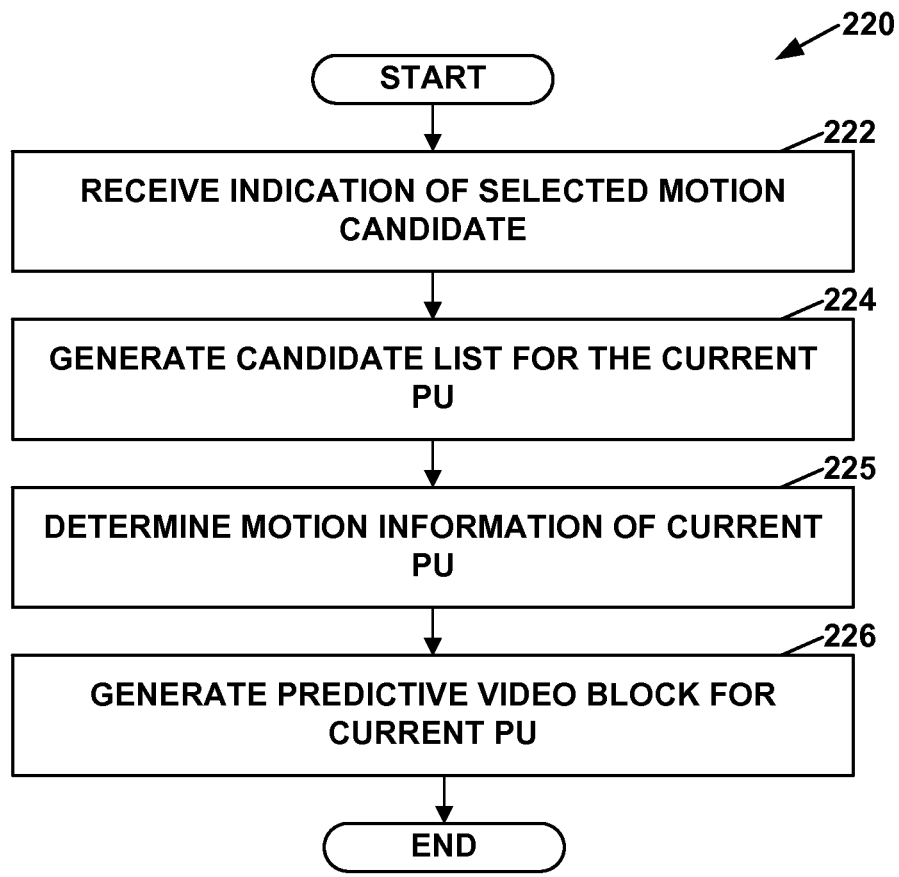
FIG. 7 is a flowchart that illustrates an example motion compensation operation performed by a video decoder.

FIG. 7 is a flowchart that illustrates an example motion compensation operation 220 performed by a video decoder, such as video decoder 30. FIG. 7 is merely one example motion compensation operation.

When the video decoder performs motion compensation operation 220, the video decoder may receive an indication of a selected candidate for the current PU (222). For example, the video decoder may receive a candidate index that indicates a position of the selected candidate within a candidate list of the current PU.

If the motion information of the current PU is encoded using AMVP mode and the current PU is bi-directionally predicted, the video decoder may receive a first candidate index and a second candidate index. The first candidate index indicates a position in the candidate list of a selected candidate for a list 0 motion vector of the current PU. The second candidate index indicates a position in the candidate list of a selected candidate for a list 1 motion vector of the current PU.

In addition, the video decoder may generate a candidate list for the current PU (224). In accordance with the techniques of this disclosure, the video decoder may generate the candidate list such that each candidate in the candidate list that is generated based on motion information of at least one other PU is generated without using motion information of any other PU belonging to the current CU. The video decoder may generate such a candidate list for the current PU in various ways. For example, the video decoder may use the techniques described below with reference to FIGS. 8-15 to generate the candidate list for the current PU. When the video decoder generates a temporal candidate for the candidate list, the video decoder may explicitly or implicitly set the reference picture index that identifies the reference picture that includes the collocated PU, as described above with regard to FIG. 5.

In some examples, a video coder, such as a video encoder or a video decoder, may adapt the size of the candidate list for a CU based on PU size, PU shape, PU index, information about neighboring video blocks, and/or other information. The information about neighboring video blocks may include the prediction modes of the neighboring video blocks, the motion vectors of the neighboring video blocks, motion vector differences of the neighboring video blocks, the reference picture indexes of the neighboring video blocks, the prediction directions of the neighboring video blocks, the transform coefficients of the neighboring video blocks, and/or other information about the neighboring video blocks. For example, for a CU with 2N×N mode, the original candidate for the second PU that is located inside the first PU may be removed from the candidate list. As a result, in this case, the size of the candidate list for the second PU may be smaller than the size of the candidate list for the first PU.

In some examples, the video coder may adapt the order of the candidate lists for PUs based on PU size, PU shape, PU index, information about neighboring video blocks, and/or other information. The information about the neighboring video blocks may include prediction modes of the neighboring video blocks, motion vectors of the neighboring video blocks, motion vector differences of the neighboring video blocks, reference picture indexes of the neighboring video blocks, prediction directions of the neighboring video blocks, transform coefficients of the neighboring video blocks, and/or other information about the neighboring video blocks. For example, when a merge candidate list is generated based on the motion information of PUs outside the current CU, the order of the candidates in the candidate list may be adjusted for each PU. For those candidates that are located further away from the PU, their order in the list may be lowered relative to those that are closer to the PU. As a result, although the same set of candidates is used to form a candidate list for each PU, the order of the candidates in the list may be different for each PU in the CU due to different PU locations relative to those candidates.

After generating the candidate list for the current PU, the video decoder may determine the motion information of the current PU based on motion information indicated by the one or more selected candidates in the candidate list for the current PU (225). For example, if the motion information of the current PU is encoded using merge mode, the motion information of the current PU may be the same as the motion information indicated by the selected candidate. If the motion information of the current PU is encoded using AMVP mode, the video decoder may use the one or more motion vectors indicated by the selected candidate or candidates and the one or more MVDs indicated in the bitstream to reconstruct a motion vector or motion vectors of the current PU. The reference picture index(es) and prediction direction indicator(s) of the current PU may be the same as the reference picture index(es) and prediction direction indicator(s) of the one or more selected candidates.

After determining the motion information of the current PU, the video decoder may generate a predictive video block for the current PU based on one or more reference blocks indicated by the motion information of the current PU (226).

Figure 8B:
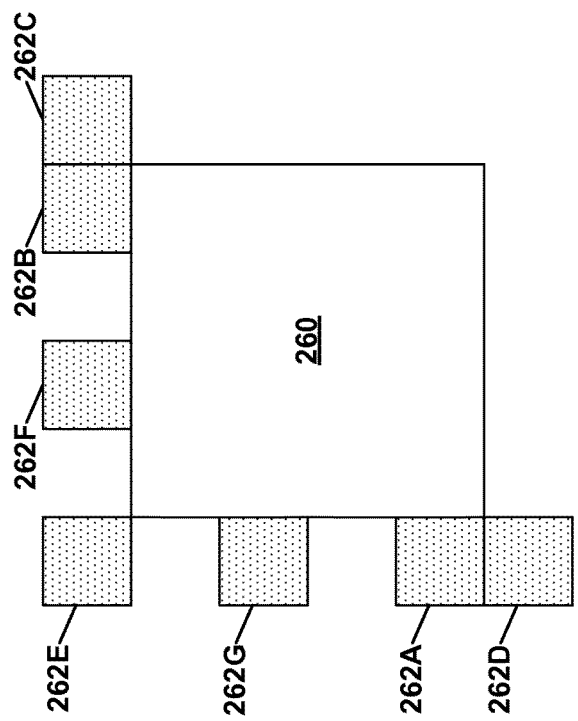
FIG. 8B is a conceptual diagram that illustrates a CU and example alternative source locations associated with the CU.
Figure 8A:
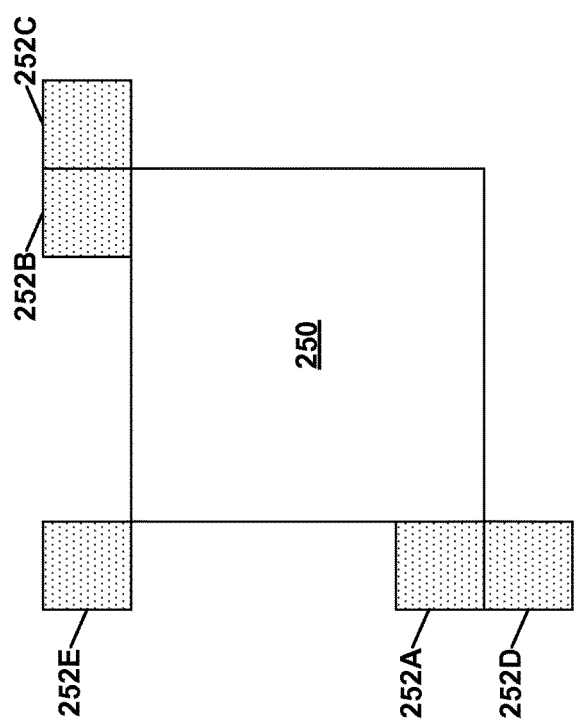
FIG. 8A is a conceptual diagram that illustrates a coding unit (CU) and example source locations associated with the CU.

In FIGS. 8A and 8B, all PUs of a CU share a single merge candidate list, which may be identical to the merge candidate list of a 2N×2N PU. Thus, in FIGS. 8A and 8B, a video coder may generate a merge candidate list shared by all of the PUs of the current CU. In this way, the current CU may be partitioned into the plurality of PUs according to a selected partitioning mode (e.g. 2N×N, N×2N, N×N, etc.) other than a 2N×2N partitioning mode and the motion information of each of the PUs is determinable based on motion information indicated by a selected candidate in the merge candidate list. The video coder may generate the shared merge list for the plurality of PUs in the same way as if the CU was partitioned in a 2N×2N mode. In other words, the merge candidate list is the same as a candidate list that would be generated if the current CU had been partitioned according to the 2N×2N partitioning mode. One advantage of such a scheme may be that for each CU, regardless of how many PUs the CU has, only one merge list may to be generated. Additionally based on such a scheme, motion estimation for different PUs in the same CU can be done in parallel. In this example, the merge list that is shared by all the PUs of the CU may be generated in the same way as if the CU was partitioned according to a 2N×N partitioning mode. FIGS. 8A and 8B are examples in which a merge candidate list is generated without using motion information of PUs of the current CU and the same merge candidate list is shared by all the PUs of the current CU.

FIG. 8A is a conceptual diagram that illustrates a CU 250 and example source locations 252A-E associated with CU 250. This disclosure may refer to source locations 252A-252E collectively as source locations 252. Source location 252A is located to the left of CU 250. Source location 252B is located above CU 250. Source location 252C is located to the upper-right of CU 250. Source location 252D is located to the lower-left of CU 250. Source location 252E is located to the above-left of CU 250. Each of source locations 252 is outside of CU 250.

CU 250 may include one or more PUs. A video coder may generate motion candidates for each of PU of CU 250 based on motion information of PUs that cover source locations 252. In this way, the video coder may generate candidate lists for the PUs of CU 250 such that each candidate that is generated based on motion information of at least one other PU is generated without using the motion information of any other PUs that belong to CU 250. Generating the candidate lists for the PUs of CU 250 in this way may enable the video coder to generate the candidate lists of multiple PUs of CU 250 in parallel.

FIG. 8B is a conceptual diagram that illustrates a CU 260 and example source locations 262A-G associated with CU 260. This disclosure may refer to source locations 262A-G collectively as source locations 262. The example of FIG. 8B is similar to the example of FIG. 8A, except that CU 260 is associated with seven source locations instead of five source locations as shown in FIG. 8A. In the example of FIG. 8B, the video coder may generate candidate lists for each PU of CU 260 based on motion information of one or more PUs that cover source locations 262.

FIG. 9A is a conceptual diagram that illustrates example reference index source locations to the left of a 2N×N partitioned CU 300. PU 302 and PU 304 belong to CU 300. In the example of FIG. 9A, reference index source location 306 is associated with PU 302. Reference index source location 308 is associated with PU 304.

FIG. 9B is a conceptual diagram that illustrates example reference index source locations to the left of an N×2N CU 340. PU 342 and PU 344 belong to CU 340. In the example of FIG. 9B, reference index source location 348 is associated with both PU 342 and PU 344.

FIG. 9C is a conceptual diagram that illustrates example reference index source locations above a 2N×N partitioned CU 320. PU 322 and PU 324 belong to CU 320. In the example of FIG. 9C, reference index source location 328 is associated with PU 322 and PU 324.

FIG. 9D is a conceptual diagram that illustrates example reference index source locations above an N×2N CU 360. PU 362 and PU 364 belong to CU 360. In the example of FIG. 9D, reference index source location 366 is associated with PU 362. Reference index source location 368 is associated with PU 364.

FIG. 9E is a conceptual diagram that illustrates example reference index source locations to the left of an example N×N partitioned CU 400. CU 400 is partitioned into PUs 402, 404, 406, and 408. Reference index source location 410 is associated with PUs 402 and 404. Reference index source location 412 is associated with PUs 406 and 408.

FIG. 9F is a conceptual diagram that illustrates example reference index source locations above an N×N partitioned CU 420. CU 420 is partitioned into PUs 422, 424, 426, and 428. Reference index source location 430 is associated with PUs 422 and 426. Reference index source location 432 is associated with PUs 424 and 428.

As illustrated in the examples of FIGS. 9A-9F, if the original reference index source location associated with the current PU is within the current CU, the video coder may, in accordance with the techniques of this disclosure and instead of using the original reference index source location, identify a location outside the current CU that corresponds to the original reference index source location associated with the current PU. A location outside the current CU may correspond to the original reference index source location inside the current CU based on the criteria that the locations are spatially situated relative to the current PU in the same way (e.g., both are below-left, left, above-left, above, or above right of the current PU). The video coder may infer that the relevant reference picture index is equal to a reference picture index of a PU that covers the corresponding location outside the current CU. In this way, the video coder may determine the relevant reference picture index without using the motion information of any other PUs inside the current CU.

As illustrated in the example of FIG. 9C, a location 326 immediately above PU 324 is within CU 320. Rather than use the reference picture index of the PU that covers location 326, the video coder may use the reference picture index of the PU that covers a corresponding location outside CU 320 (i.e., reference index source location 328). Similarly, in the example of FIG. 9B, a location 346 immediately to the left of PU 344 is within CU 340. Rather than use the reference picture index of the PU that covers location 346, the video coder may use the reference picture index of the PU that covers a corresponding location outside CU 340 (i.e., reference index source location 348). In some examples, the corresponding locations outside the current CU are spatially situated relative to the current PU in the same way as the original locations that are inside the current CU.

Thus, in response to determining that a reference index source location associated with the current PU is within the current CU, the video coder may identify a corresponding location outside the current CU. The video coder may then generate a temporal candidate based on motion information of a collocated PU in a reference picture indicated by a PU that covers the corresponding location outside the current CU. The video coder may then include the temporal candidate in the candidate list for the current CU.

FIG. 10A is a conceptual diagram that illustrates an example reference index source location to the left of a 2N×N partitioned CU 500. PU 502 and PU 504 belong to CU 500. FIG. 10B is a conceptual diagram that illustrates an example reference index source location to the left of an N×2N partitioned CU 520. PU 522 and PU 524 belong to CU 520. FIG. 10C is a conceptual diagram that illustrates an example reference index source location above a 2N×N partitioned CU 540. PU 542 and PU 544 belong to CU 540. FIG. 10D is a conceptual diagram that illustrates an example reference index source location above an N×2N partitioned CU 560. PU 562 and PU 564 belong to CU 560. FIG. 10E is a conceptual diagram that illustrates an example reference index source location to the left of an N×N partitioned CU 580. CU 580 is partitioned into PUs 582, 584, 586, and 588. FIG. 10F is a conceptual diagram that illustrates an example reference index source location above an N×N partitioned CU 600. CU 600 is partitioned into PUs 602, 604, 606, and 608.

FIGS. 10A-10F are similar to FIGS. 9A-9F in that the video coder may be configured to determine the relevant reference picture index for the current PU from a PU that covers a reference index source location associated with the current PU. However, unlike the examples of FIGS. 9A-9F, each PU of a CU is associated with the same reference index source location. In other words, the reference picture index for all PUs in the CU may be derived from a single neighbor block outside the CU.

For instance, in the example of FIG. 10A, both PU 502 and 504 are associated with a reference index source location 506 that is to the left of CU 500. In contrast, in the example of FIG. 9A, PU 302 and 304 are associated with reference index source locations 306 and 308. Similarly, in the example of FIG. 10D, both PU 562 and PU 564 are associated with a single reference index source location 566 that is above CU 560. In the example of FIG. 10E, PUs 582, 584, 586, and 588 are associated with a single reference index source location 590 that is located to the left of CU 580. In the example of FIG. 10F, PUs 602, 604, 606, and 608 are associated with a single reference index source location 610 that is located above CU 600.

In other examples, the video coder may determine the reference picture indexes of temporal candidates of each PU of a CU from any other PU that is spatially located outside the CU. For example, the video coder may determine the reference picture indexes of temporal candidates of each PU of a CU from a PU that is located to the left, located above, located above and left, located above and right, or located below and left of the CU. The use of a single or multiple source locations outside the current CU to code information inside the current CU may be applied to the current CU or blocks of other types or at different levels.

Figure 11:
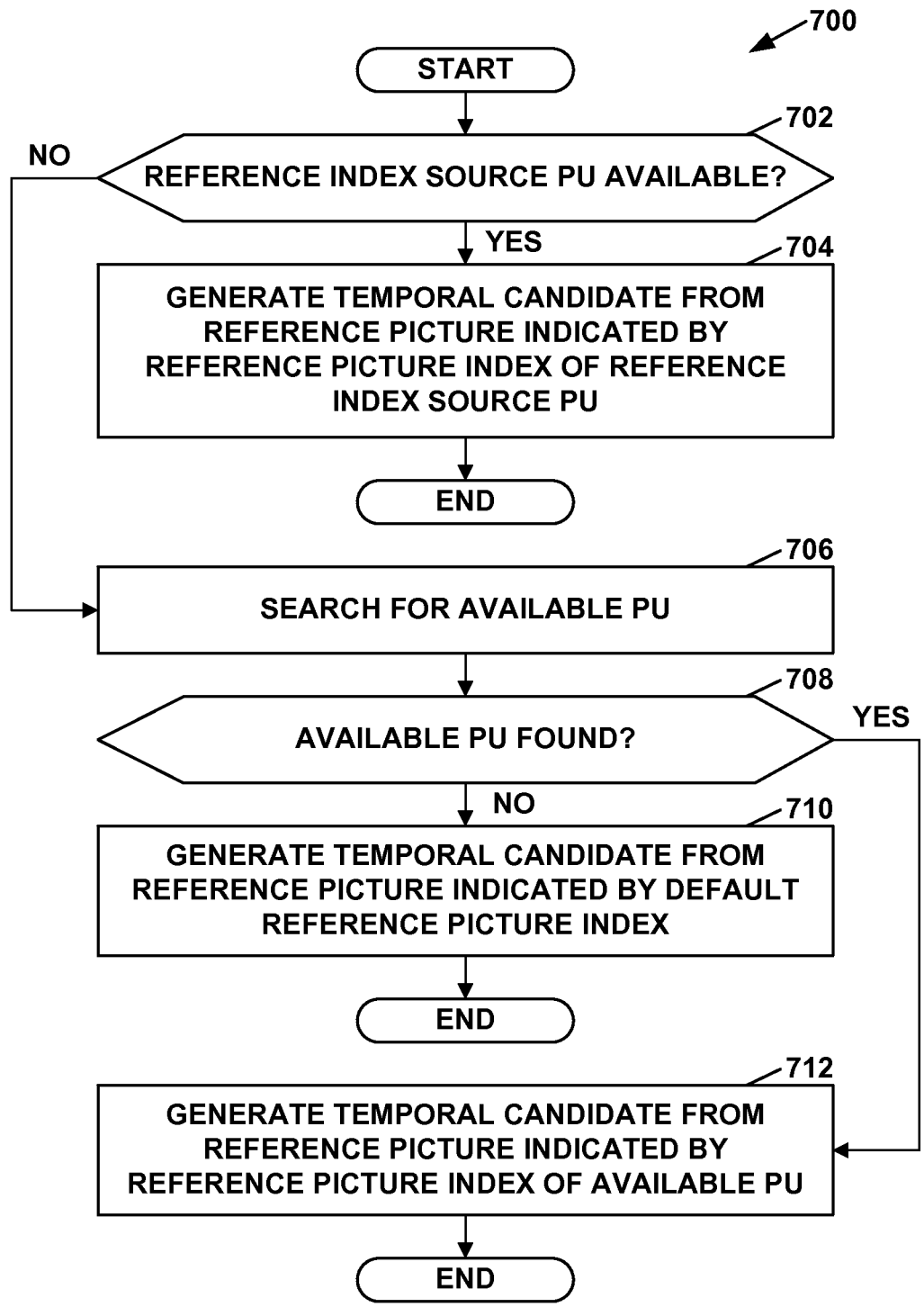
FIG. 11 is a flowchart that illustrates an example operation to generate a temporal candidate for a PU.

FIG. 11 is a flowchart that illustrates an example operation 700 to generate a temporal candidate for a PU. A video coder, such as video encoder 20 or video decoder 30, may perform operation 700. FIG. 11 is merely one example of an operation to generate a temporal candidate for a PU.

After the video coder starts operation 700, the video coder may determine whether a PU that covers the reference index source location associated with the current PU is available (702). This disclosure may refer to the PU that covers the reference index source location as the reference index source PU. The reference index source PU may be unavailable for various reasons. For example, the reference index source PU may be unavailable if the reference index source PU is not within the current picture. In another example, the reference index source PU may be unavailable if the reference index source PU is intra-predicted. In another example, the reference index source PU may be unavailable if the reference index source PU is in a different slice than the current PU.

In response to determining that the reference index source PU for the current PU is available ("YES" of 702), the video coder may generate a temporal candidate that indicates the motion information of a collocated PU in a reference picture indicated by the reference picture index of the reference index source PU (704). For instance, in the example of FIG. 9C, the PU covering location 328 may be the reference index source PU for PU 324. In this instance, the video coder may generate a temporal candidate for PU 324 that indicates the motion information of a collocated PU in a reference picture indicated by the reference picture index of the PU covering location 328.

In response to determining that the reference index source PU for the current PU is not available ("NO" of 702), the video coder may search for an available PU among the PUs that spatially neighbor the current CU (706). If the video coder does not find an available PU ("NO" of 708), the video coder may generate a temporal candidate that indicates the motion information of a collocated PU in a reference picture indicated by a default reference picture index (710). For example, if the video coder does not find an available PU, the video coder may generate a temporal candidate for the current PU from a collocated PU in a reference picture indicated by a reference picture index equal to 0, 1, or another number that is selected by default.

On the other hand, if the video coder finds an available PU ("YES" of 708), the video coder may generate a temporal candidate that indicates the motion information of a collocated PU in a reference picture indicated by a reference picture index of the available PU (712). For example, if the reference picture index of the available PU is equal to 1, the video coder may generate a temporal candidate that indicates the motion information of a collocated PU in a reference picture indicated by the reference picture index 1.

In another example, if the reference index source PU is unavailable, the video coder may generate the temporal candidate that indicates the motion information of a collocated PU in a reference picture indicated by a default reference picture index. In this example, the default reference picture index may be a default value (e.g., zero) or may be signaled in a picture parameter set, a slice header, an APS, or another syntax structure.

Thus, in the example of FIG. 11, the video coder may, in response to determining that a reference index source PU is not available, search for an available PU that spatially neighbors the current CU. The video coder may then generate a temporal candidate based on motion information of a collocated PU in a reference picture indicated by a reference picture index of the available PU. The video coder may include the temporal candidate in the candidate list for the current PU.

Figure 12:
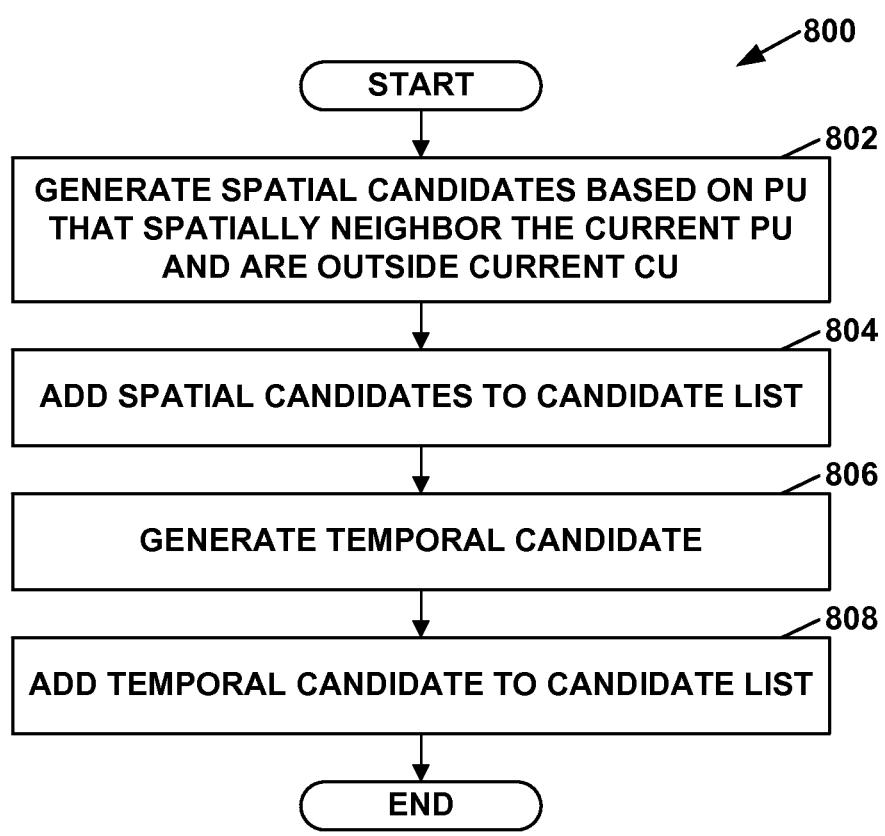
FIG. 12 is a flowchart that illustrates a first example operation to generate a candidate list for a PU.

FIG. 12 is a flowchart that illustrates an example operation 800 to generate a candidate list for a PU. A video coder, such as video encoder 20 or video decoder 30, may perform operation 800. FIG. 12 is merely one example of an operation to generate a candidate list for a PU.

After the video coder starts operation 800, the video coder may generate spatial candidates based on the motion information of PUs that spatially neighbor the current PU and are outside the current CU (802). In this way, candidates that are within the current CU are excluded from the candidate list. For example, for a top-right PU of an N×N partitioned CU, a left candidate (L) and the bottom left candidate (BL) are excluded from its candidate list. For a bottom-left PU of an N×N partitioned CU, the above candidate (A) and the right above candidate (RA) are excluded from the candidate list. For a bottom-right PU of an N×N partitioned CU, three candidates including the left candidate (L), the above candidate (A) and the left above candidate (LA) are excluded from the candidate list.

The video coder may then add the spatial candidates to the candidate list for the current PU (804). In addition, the video coder may generate a temporal candidate that indicates the motion information of a collocated PU in a reference picture (806). The video coder may then add the temporal candidate to the candidate list for the current PU (808).

The video coder may perform operation 800 when the motion information of the current PU is signaled in merge mode. The video coder may also perform operation 800 or a similar operation when the motion information of the current PU is signaled in AMVP mode. In examples where the current CU is signaled in AMVP mode, the candidates in the candidate list may be AMVP candidates.

In this way, the video coder may generate spatial candidates based on motion information of PUs that spatially neighbor a current PU and are outside the current CU. The video coder may then include the spatial candidates in the candidate list for the current PU.

Figure 13:
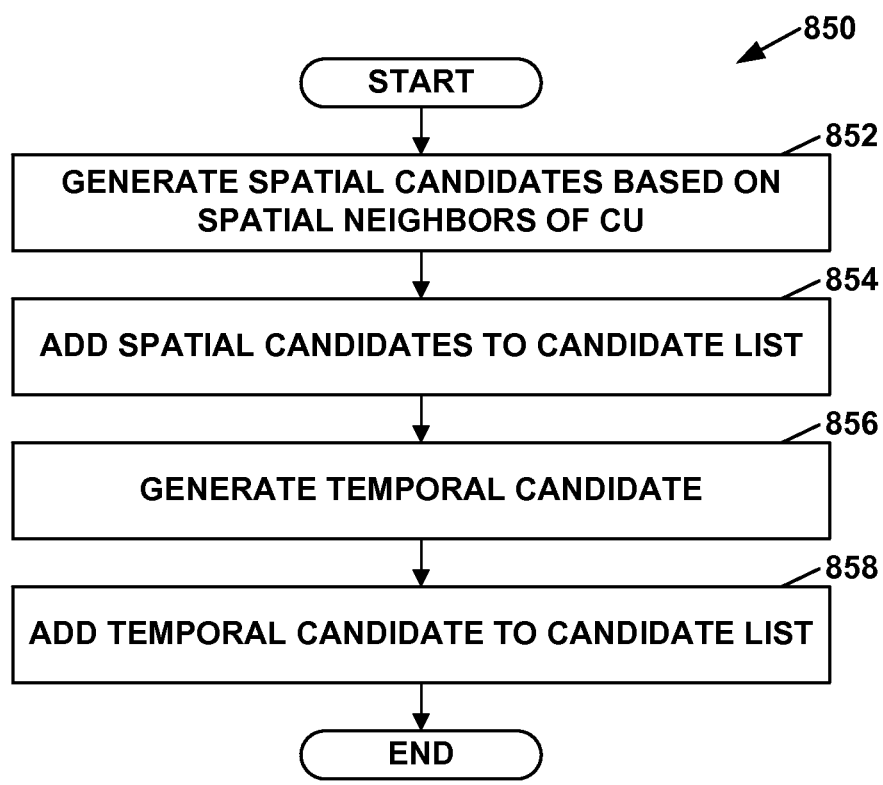
FIG. 13 is a flowchart that illustrates a second example operation to generate a candidate list for a PU.

FIG. 13 is a flowchart that illustrates an example operation 850 to generate a candidate list for a PU. A video coder, such as video encoder 20 or video decoder 30, may perform operation 850. FIG. 13 is merely one example of an operation to generate a candidate list for a PU.

After the video coder starts operation 850, the video coder may generate spatial candidates for the current PU based on motion information of PUs that are spatial neighbors of the current CU (852). The video coder may then add the spatial candidates to the candidate list for the current PU (854). In the example of FIG. 13, the video coder may substitute spatial candidate source locations that neighbor the current PU but are within the current CU with corresponding spatial candidate source locations that are outside the current CU. Thus, the locations used by the video coder in FIG. 13 to generate the spatial candidates are moved to (i.e., substituted with) corresponding locations outside the current CU. The corresponding locations outside the current CU may be located at any neighboring block position: left, above, above left, above right, below left to the current CU. Thus, instead of removing dependent candidates from the candidate list as described above with regard to FIG. 12), candidates can be taken from neighbor CUs located outside of the current CU. As described below, FIGS. 14A, 14B, 15A, 15B, 15C, and 15D illustrate spatial candidate source locations used by the video coder in accordance with operation 850 to generate spatial candidates.

In some examples, if a spatial candidate source location that neighbors the current PU is not within the current CU and the corresponding PU (i.e., the PU that covers the spatial candidate source location) is unavailable, the video coder may perform a searching process among neighboring PUs to find an available PU. If the video coder is able to find an available PU, the video coder may generate a spatial candidate based on the motion information of the available PU. Alternatively, if a spatial candidate source location that neighbors the current PU is not within the current CU and the corresponding PU (i.e., the PU that covers the spatial candidate source location) is unavailable, the video coder may generate a spatial candidate that has a default value, such as zero. The default value may be signaled in a PPS, a slice header, an APS, or another type of header.

In addition, the video coder may generate a temporal candidate for the current PU (856). The video coder may then add the temporal candidate to the candidate list for the current PU (858).

The video coder may perform operation 850 when the motion information of the current PU is signaled in merge mode. The video coder may also perform operation 850 or a similar operation when the motion information of the current PU is signaled in AMVP mode. In examples where the current CU is signaled in AMVP mode, the candidates in the candidate list may be AMVP candidates.

In the example of FIG. 13, a set of spatial candidate source locations for the current CU may initially include a first spatial candidate source location that is below and to the left of the current PU, a second spatial candidate source location that is to the left of the current PU, a third spatial candidate source location that is above-left of the current PU, a fourth spatial candidate source location that is above the current PU, and a fifth spatial candidate source location that is above-right of the current PU. The video coder may substitute any of the spatial candidate source locations that are within the current CU with corresponding spatial candidate source locations outside the current CU. The video coder may then generate spatial candidates based on motion information of PUs that cover the spatial candidate source locations and include the spatial candidates in the candidate list for the current PU.

Figure 14A:
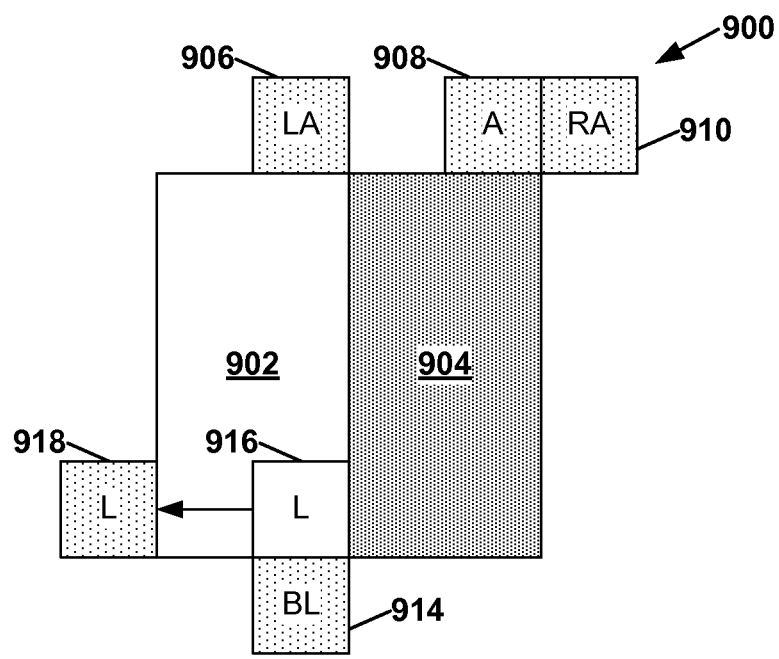
FIG. 14A is a conceptual diagram that illustrates an example spatial candidate source locations associated with a left PU of an example N×2N partitioned CU.

FIG. 14A is a conceptual diagram that illustrates example spatial candidate source locations associated with a right PU of an example N×2N partitioned CU 900. PU 902 and PU 904 belong to CU 900. The video coder may generate spatial candidates for PU 904 based on the motion information of PUs that cover spatial candidate source locations 906, 908, 910, 914, and 918. Spatial candidate source location 906 is located to the left-above of PU 904. Spatial candidate source location 908 is located above PU 904. Spatial candidate source location 910 is located to the right-above of PU 904. Spatial candidate source location 914 is located to the below-left of PU 904. Location 916 is spatially located to the left of PU 904. However, rather than use the motion information of the PU that covers location 916 (i.e., PU 902) to generate a spatial candidate for PU 904, the video coder may use the motion information of a PU that covers spatial candidate source location 918 to generate a spatial candidate for PU 904. Spatial candidate source location 918 is spatially to the left of CU 900.

Figure 14B:
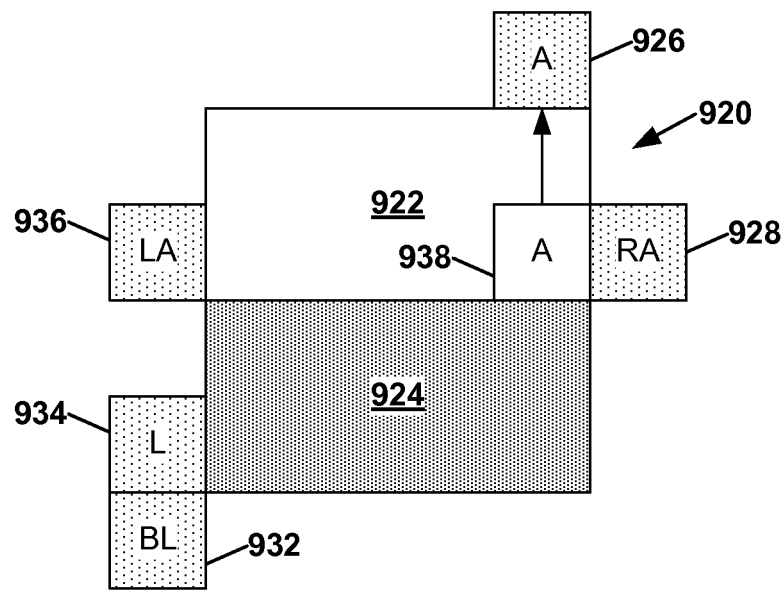
FIG. 14B is a conceptual diagram that illustrates example spatial candidate source locations associated with a lower PU of a 2N×N partitioned CU.

FIG. 14B is a conceptual diagram that illustrates example spatial candidate source locations associated with a lower PU of a 2N×N partitioned CU 920. PU 922 and PU 924 belong to CU 920. The video coder may generate spatial candidates for PU 922 based on spatial candidate source locations that are spatially left-above, above, right-above, left, and below-left of PU 922. Because of the position of PU 922 within CU 920, none of these spatial candidate source locations are within CU 920. Hence, there is no need for the video coder to "move" any of the spatial candidate source locations associated with PU 922 to generate spatial candidates for PU 922 that are based on motion information of PUs outside CU 920.

The video coder may generate spatial candidates for PU 924 based on spatial candidate source locations 926, 928, 932, 934, and 936. Spatial candidate source location 928 is located to the above right of PU 924. Spatial candidate source location 932 is spatially located to the below left of PU 924. Spatial candidate source location 934 is spatially located to the left of PU 924. Spatial candidate source location 936 is spatially located to the left above of PU 924.

Location 938 is spatially located above PU 924. However, location 938 is located within CU 920. Accordingly, rather than use the motion information of the PU that covers location 938 (i.e., PU 922) to generate a spatial motion candidate for PU 924, the video coder may generate a spatial motion candidate for PU 924 based on the motion information of a PU that covers spatial candidate source location 926.

Figure 15A:
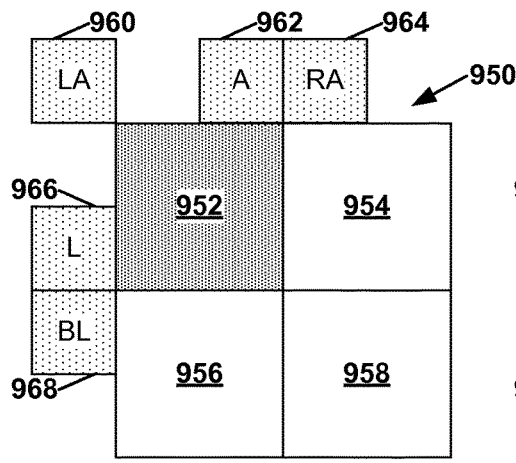
FIGS. 15A-15D are conceptual diagrams that illustrate example spatial candidate source locations associated with PUs of an N×N partitioned CU.

FIGS. 15A-15D are conceptual diagrams that illustrate spatial candidate source locations associated with PUs of an N×N partitioned CU 950. PUs 952, 954, 956, and 958 belong to CU 950. FIG. 15A is a conceptual diagram that illustrates example spatial candidate source locations associated with PU 952. As illustrated in the example of FIG. 15A, the video coder may generate spatial motion candidates for PU 952 based on the motion information of PUs that cover spatial candidate source locations 960, 962, 964, 966, and 968. None of spatial candidate source locations 960, 962, 964, 966, or 968 are located within CU 950. Accordingly, there is no need for the video coder to "move" any of the spatial candidate source locations associated with PU 952 to generate a motion candidate for PU 952.

Figure 15B:
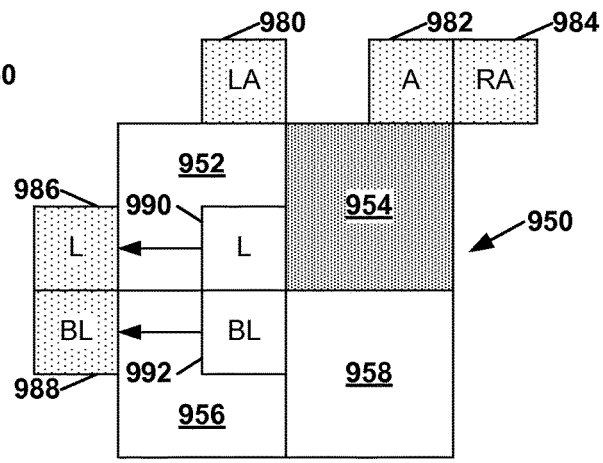

FIG. 15B is a conceptual diagram that illustrates example spatial candidate source locations associated with PU 954. As illustrated in the example of FIG. 15B, the video coder may generate spatial motion candidates for PU 954 based on the motion information of PUs that cover spatial candidate source locations 980, 982, 984, 986, and 988. Spatial candidate source locations 980, 982, and 984 are located outside of CU 950. Location 990 is spatially to the left of PU 954. Location 992 is spatially to the below-left of PU 954. However, locations 990 and 992 are within CU 950. Hence, instead of generating spatial motion candidates based on the motion information of the PUs that cover locations 990 and 992 (i.e., PUs 952 and 956), the video coder may generate spatial motion candidates for PU 954 based on the motion information of PUs that cover corresponding locations outside CU 950 (i.e., spatial candidate source locations 986 and 988). Spatial candidate source locations 986 and 988 are outside PU 950.

Figure 15C:
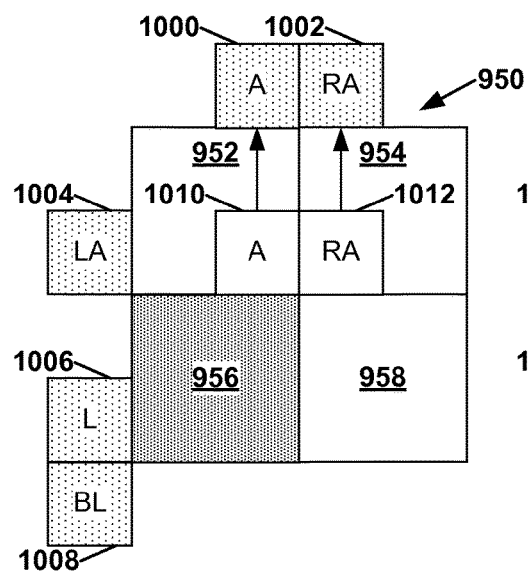

FIG. 15C is a conceptual diagram that illustrates example spatial candidate source locations associated with PU 956. As illustrated in the example of FIG. 15C, the video coder may generate spatial motion candidates for PU 956 based on the motion information of PUs that cover spatial candidate source locations 1000, 1002, 1004, 1006, and 1008. Spatial candidate source locations 1000, 1002, 1004, 1006, and 1008 are locations outside of CU 950. Location 1010 is spatially above PU 956. Location 1012 is spatially to the above-right of PU 956. However, locations 1010 and 1012 are within CU 950. Hence, instead of generating spatial motion candidates based on the motion information of the PUs that cover locations 990 and 992 (i.e., PUs 952 and 954), the video coder may generate spatial motion candidates for PU 954 based on the motion information of PUs that cover corresponding locations outside CU 950 (i.e., spatial candidate source locations 1000 and 1002).

Figure 15D:
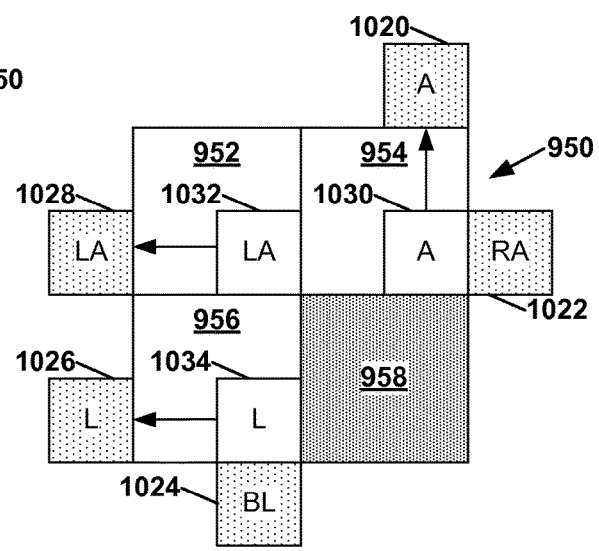

FIG. 15D is a conceptual diagram that illustrates example spatial candidate source locations associated with PU 958. As illustrated in the example of FIG. 15D, the video coder may generate spatial motion candidates based on the motion information of PUs that cover spatial candidate source locations 1020, 1022, 1024, 1026, and 1028. Spatial candidate source locations 1020, 1022, 1024, 1026, and 1028 are locations outside of CU 950. Location 1030 is spatially above PU 956. Location 1032 is spatially to the above-left of PU 956. Location 1034 is spatially to the left of PU 958. However, locations 1030, 1032, and 1034 are within CU 950. Hence, instead of generating spatial motion candidates based on the motion information of the PUs that cover locations 1030, 1032, and 1034 (i.e., PUs 954, 952, and 956), the video coder may generate spatial motion candidates for PU 954 based on the motion information of PUs that cover corresponding locations outside CU 950 (i.e., spatial candidate source locations 1020, 1028 and 1026).

FIGS. 14A, 14B, and 15A-15D show CUs partitioned according to N×2N, 2N×N, and N×N partitioning modes. However, similar concepts may be applied with regard to other partitioning modes.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data performed by a video decoder, the method comprising:

generating a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and for each prediction unit (PU) in a plurality of PUs belonging to the current CU:
  determining, based on motion information indicated by a candidate in the shared candidate list, a motion vector of the PU; and
  using the motion vector of the PU to identify a reference sample for the PU.

2. The method of claim 1, wherein the shared candidate list comprises a merge candidate list, and wherein generating the merge candidate list comprises generating the merge candidate list based on motion information of PUs that are outside the current CU.

3. The method of claim 2, wherein the current CU is partitioned into the plurality of PUs according to a selected partitioning mode other than a 2N×2N partitioning mode, the method comprises determining motion information of each of the PUs based on motion information indicated by a selected candidate in the merge candidate list, and the merge candidate list is the same as a candidate list that would be generated if the current CU had been partitioned according to the 2N×2N partitioning mode.

4. The method of claim 1, wherein generating the shared candidate list comprises:
  generating a temporal candidate based on motion information of a collocated PU in a reference frame indicated by a default reference picture index; and
  including the temporal candidate in the shared candidate list.

5. The method of claim 1, wherein generating the shared candidate list comprises generating each temporal candidate in the shared candidate list based on motion information of PUs in reference pictures indicated by reference picture indexes of PUs that cover locations outside the current CU.

6. The method of claim 5, wherein generating the shared candidate list comprises, for each respective PU of the plurality of PUs:
  in response to determining that a reference index source location associated with the respective PU is within the current CU, identifying a corresponding location outside the current CU;
  generating a temporal candidate based on motion information of a collocated PU in a reference picture indicated by a PU that covers the corresponding location outside the current CU; and
  including the temporal candidate in the shared candidate list.

7. The method of claim 1, wherein generating the shared candidate list comprises, for each respective PU of the plurality of PUs:
  in response to determining that a reference index source PU is not available, searching for an available PU that spatially neighbors the current CU, the reference index source PU covering a reference index source location associated with the respective PU;

generating a temporal candidate based on motion information of a collocated PU in a reference picture indicated by a reference picture index of the available PU; and including the temporal candidate in the shared candidate list.

8. The method of claim 1, wherein, for each respective PU of the plurality of PUs, generating the shared candidate list comprises:

generating one or more candidates based on motion information of PUs that spatially neighbor the respective PU and are outside the current CU; and including the one or more candidates in the shared candidate list.

9. The method of claim 1, further comprising generating a reconstructed video block for the current CU based on the reference samples for the PUs.

10. The method of claim 9, wherein the shared candidate list is generated as part of using a merge mode inter prediction mode.

11. The method of claim 9, wherein the shared candidate list is generated as part of an Advanced Motion Vector Prediction inter prediction mode.

12. A video decoding device that comprises:

a memory configured to store video data; and one or more processors configured to:

generate a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and;

for each prediction unit (PU) in a plurality of PUs belonging to the current CU:

determine, based on motion information indicated by a candidate in the shared candidate list, a motion vector of the PU; and use the motion vector of the PU to identify a reference sample for the PU.

13. The video decoding device of claim 10, wherein the shared candidate list comprises a merge candidate list, and wherein the one or more processors are configured to generate the merge candidate list based on motion information of PUs that are outside the current CU.

14. The video decoding device of claim 13, wherein the current CU is partitioned into the plurality of PUs according to a selected partitioning mode other than a 2N×2N partitioning mode, the one or more processors are configured to determine motion information of each of the PUs based on motion information indicated by a selected candidate in the merge candidate list, and the merge candidate list is the same as a candidate list that would be generated if the current CU had been partitioned according to the 2N×2N partitioning mode.

15. The video decoding device of claim 12, wherein the one or more processors are configured to:

generate a temporal candidate based on motion information of a collocated PU in a reference frame indicated by a default reference picture index; and include the temporal candidate in the shared candidate list.

16. The video decoding device of claim 12, wherein the one or more processors are configured to generate each temporal candidate in the shared candidate list based on motion information of PUs in reference pictures indicated by reference picture indexes of PUs that cover locations outside the current CU.

17. The video decoding device of claim 16, wherein, for each respective PU of the plurality of PUs, the one or more processors are configured to:

identify, in response to determining that a reference index source location associated with the respective PU is within the current CU, a corresponding location outside the current CU;

generate a temporal candidate based on motion information of a collocated PU in a reference picture indicated by a PU that covers the corresponding location outside the current CU; and include the temporal candidate in the shared candidate list.

18. The video decoding device of claim 12, wherein, for each respective PU of the plurality of PUs, the one or more processors are configured to:

search, in response to determining that a reference index source PU is not available, for an available PU that spatially neighbors the current CU, the reference index source PU covering a reference index source location associated with the respective PU;

generate a temporal candidate based on motion information of a collocated PU in a reference picture indicated by a reference picture index of the available PU; and include the temporal candidate in the shared candidate list.

19. The video decoding device of claim 12, wherein, for each respective PU of the plurality of PUs, the one or more processors are configured to:

generate one or more candidates based on motion information of PUs that spatially neighbor the respective PU and are outside the current CU; and include the one or more candidates in the shared candidate list.

20. The video decoding device of claim 12, wherein the one or more processors are configured to generate a reconstructed video block for the current CU based on the reference samples for the PUs.

21. The video decoding device of claim 20, wherein the shared candidate list is generated as part of using a merge mode inter prediction mode.

22. The video decoding device of claim 20, wherein the shared candidate list is generated as part of an Advanced Motion Vector Prediction inter prediction mode.

23. The video decoding device of claim 12, wherein the video decoding device is a mobile computing device.

24. A video decoding device that comprises:

means for generating a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and for each prediction unit (PU) in a plurality of PUs belonging to the current CU:

means for determining, based on motion information indicated by a candidate in the shared candidate list, a motion vector of the PU; and means for using the motion vector of the PU to identify a reference sample for the PU.

25. A non-transitory computer readable storage medium having instructions stored thereon that, when executed, configure one or more processors to:
generate a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and
for each prediction unit (PU) in a plurality of PUs belonging to the current CU:
determine, based on motion information indicated by a selected candidate for the PU in the shared candidate list, a motion vector of the PU; and
use the motion vector of the PU to identify a reference sample for the PU.

26. A method for encoding video data performed by a video encoder, the method comprising,
generating a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and
for each prediction unit (PU) in a plurality of PUs belonging to the current CU:
identifying, based on motion information indicated by a selected candidate in the shared candidate list, a reference sample for the PU;
using the motion vector of the PU to identify a reference sample for the PU.

27. The method of claim 26, wherein the shared candidate list comprises a merge candidate list, and wherein generating the merge candidate list comprises generating the merge candidate list based on motion information of PUs that are outside the current CU.

28. The method of claim 27, wherein the current CU is partitioned into the plurality of PUs according to a selected partitioning mode other than a 2N×2N partitioning mode, motion information of each of the PUs is based on motion information indicated by a selected candidate in the merge candidate list, and the merge candidate list is the same as a candidate list that would be generated if the current CU had been partitioned according to the 2N×2N partitioning mode.

29. The method of claim 26, wherein generating the shared candidate list comprises:
generating a temporal candidate based on motion information of a collocated PU in a reference frame indicated by a default reference picture index; and
including the temporal candidate in the shared candidate list.

30. The method of claim 26, wherein generating the shared candidate list comprises generating each temporal candidate in the shared candidate list based on motion information of PUs in reference pictures indicated by reference picture indexes of PUs that cover locations outside the current CU.

31. The method of claim 30, wherein generating the shared candidate list comprises, for each respective PU of the plurality of PUs:
in response to determining that a reference index source location associated with the respective PU is within the current CU, identifying a corresponding location outside the current CU;
generating a temporal candidate based on motion information of a collocated PU in a reference picture indicated by a PU that covers the corresponding location outside the current CU; and
including the temporal candidate in the shared candidate list.

32. The method of claim 26, wherein generating the shared candidate list comprises:
in response to determining that a reference index source PU is not available, searching for an available PU that spatially neighbors the current CU, the reference index source PU being a PU that covers a reference index source location associated with the respective PU;
generating a temporal candidate based on motion information of a collocated PU in a reference picture indicated by a reference picture index of the available PU; and
including the temporal candidate in the shared candidate list.

33. The method of claim 26, wherein generating the shared candidate list comprises:
generating one or more candidates based on motion information of PUs that spatially neighbor the respective PU and are outside the current CU; and
including the one or more candidates in the shared candidate list.

34. The method of claim 26, wherein the shared candidate list is generated as part of using at least one of: a merge mode inter prediction mode or an Advanced Motion Vector Prediction inter prediction mode.

35. The method of claim 26, further comprising:
for each PU of the plurality of PUs, generating a predictive video block of the PU based on the reference block for the PU; and
generating residual data for the current CU by subtracting the predictive video blocks of the PUs of the CU from a video block of the CU.

36. A video encoding device that comprises:
a memory configured to store video data; and
one or more processors configured to:
generate a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and
for each prediction unit (PU) in a plurality of PUs belonging to the current CU:
identify, based on motion information indicated by a selected candidate in the shared candidate list, a reference sample for the PU; and use the motion vector of the PU to identify a reference sample for the PU.

37. The video encoding device of claim 36, wherein the shared candidate list comprises a merge candidate list, and wherein the one or more processors are configured to generate the merge candidate list based on motion information of PUs that are outside the current CU.

38. The video encoding device of claim 37, wherein the current CU is partitioned into the plurality of PUs according to a selected partitioning mode other than a 2N×2N partitioning mode, and motion information of each of the PUs is determinable based on motion information indicated by a selected candidate in the merge candidate list, wherein the merge candidate list is the same as a candidate list that would be generated if the current CU had been partitioned according to the 2N×2N partitioning mode.

39. The video encoding device of claim 36, wherein, for each respective PU of the plurality of PUs, the one or more processors are configured to:
  generate a temporal candidate based on motion information of a collocated PU in a reference frame indicated by a default reference picture index; and
  include the temporal candidate in the shared candidate list.

40. The video encoding device of claim 36, wherein the one or more processors are configured to generate each temporal candidate in the shared candidate list based on motion information of PUs in reference pictures indicated by reference picture indexes of PUs that cover locations outside the current CU.

41. The video encoding device of claim 40, wherein, for each respective PU of the plurality of PUs, the one or more processors are configured to:
  identify, in response to determining that a reference index source location associated with the respective PU is within the current CU, a corresponding location outside the current CU;
  generate a temporal candidate based on motion information of a collocated PU in a reference picture indicated by a PU that covers the corresponding location outside the current CU; and
  include the temporal candidate in the shared candidate list.

42. The video encoding device of claim 36, wherein, for each respective PU of the plurality of PUs, the one or more processors are configured to:
  search, in response to determining that a reference index source PU is not available, for an available PU that spatially neighbors the current CU, the reference index source PU being a PU that covers a reference index source location associated with the respective PU;
  generate a temporal candidate based on motion information of a collocated PU in a reference picture indicated by a reference picture index of the available PU; and
  include the temporal candidate in the shared candidate list.

43. The video encoding device of claim 36, wherein, for each respective PU of the plurality of PUs, the one or more processors are configured to:
  generate one or more candidates based on motion information of PUs that spatially neighbor the respective PU and are outside the current CU; and
  include the one or more candidates in the shared candidate list.

44. The video encoding device of claim 36, wherein the shared candidate list is generated as part of using at least one of: a merge mode inter prediction mode or an Advanced Motion Vector Prediction inter prediction mode.

45. The video encoding device of claim 36, wherein the one or more processors are further configured to:
  for each PU of the plurality of PUs, generating a predictive video block of the PU based on the reference block for the PU; and
  generating residual data for the current CU by subtracting the predictive video blocks of the PUs of the CU from a video block of the CU.

46. The video encoding device of claim 36, wherein the video coding device is a mobile computing device.

47. A video encoding device that comprises:
  means for generating a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and
  for each prediction unit (PU) in a plurality of PUs belonging to a current coding unit (CU) of a current picture:
    means for identifying, based on motion information indicated by a selected candidate in the shared candidate list, a reference sample for the PU; and
    means for using the motion vector of the PU to identify a reference sample for the PU.

48. A non-transitory computer-readable storage medium that stores instructions that, when executed, configure one or more processors to:
  generate a shared candidate list using only neighboring blocks outside a current coding unit (CU) of a current picture, the source locations including: a first source location in the current picture above the current CU, a second source location in the current picture above right of the current CU, a third source location in the current picture above left of the current CU, a fourth source location in the current picture left of the current CU, and a fifth source location in the current picture below left of the current CU; and
  for each prediction unit (PU) in a plurality of PUs belonging to the current CU:
    identify, based on motion information indicated by a selected candidate in the shared candidate list, a reference sample for the PU; and
    use the motion vector of the PU to identify a reference sample for the PU.

49. The video decoding device of claim 12, wherein the video decoding device comprises at least one of:
  an integrated circuit;
  a microprocessor; or
  a wireless handset.

50. The video encoding device of claim 36, wherein the video encoding device comprises at least one of:
  an integrated circuit;
  a microprocessor; or
  a wireless handset.

51. The video decoding device of claim 12, further comprising a camera configured to capture the video data.

52. The video encoding device of claim 36, further comprising a display configured to display decoded video data.

* * * * *